United States Patent [19]
Takegawa et al.

[11] Patent Number: 5,678,758
[45] Date of Patent: Oct. 21, 1997

[54] TEMPERATURE CONTROL DEVICE OF A HEATING OR COOLING APPARATUS FOR SAVING ENERGY

[75] Inventors: Hirozo Takegawa, Sakai; Yuji Inoue, Daito; Hisashi Kodama, Ikoma; Tomoko Kitamura, Moriguchi; Shigeyuki Inoue, Katano, all of Japan

[73] Assignee: Matsushita Electric Industrial Co. Ltd., Osaka-fu, Japan

[21] Appl. No.: 565,436

[22] Filed: Nov. 30, 1995

[30] Foreign Application Priority Data

Dec. 1, 1994 [JP] Japan .................. 6-298228
Jun. 20, 1995 [JP] Japan .................. 7-153070
Nov. 16, 1995 [JP] Japan .................. 7-298013

[51] Int. Cl.⁶ .............. F23N 5/20; G05D 15/00
[52] U.S. Cl. ............ 236/46 R; 165/267; 236/78 D
[58] Field of Search ............ 236/46 R, 78 D; 165/267; 62/231

[56] References Cited

U.S. PATENT DOCUMENTS 4,655,279  4/1987  Harmon, Jr. ............... 165/267
5,415,346  5/1995  Bishop ....................... 236/78 D
5,588,589  12/1996 Ishihara et al. ............ 165/267 X

FOREIGN PATENT DOCUMENTS 2302548  12/1990  Japan .

*Primary Examiner*—William E. Wayner
*Attorney, Agent, or Firm*—Price, Gess & Ubell

[57] ABSTRACT

A temperature control device of a heating apparatus comprising: an input unit for receiving input of a set temperature; a heating/cooling unit for raising/dropping temperature of a medium, from which a person receives heat; a set temperature reaching unit for controlling the heating/cooling unit so that temperature of the medium is raised to the set temperature and maintained afterwards; a time judgement unit for judging whether a given time has passed after the temperature of the medium is raised to the set temperature; and an imperceptible temperature change unit for controlling the heating/cooling unit, if the time judgement unit judges that the given time has passed, so that the temperature of the medium drops/rises by an amount within a given range by which human beings cannot perceive changes in temperature at a temperature change rate by which human beings cannot perceive changes in temperature.

According to the temperature control device, after a person sets a room temperature, it drops/rises by an amount which cannot be perceived by the person during heating/cooling.

15 Claims, 18 Drawing Sheets during cooling during heating during cooling during heating

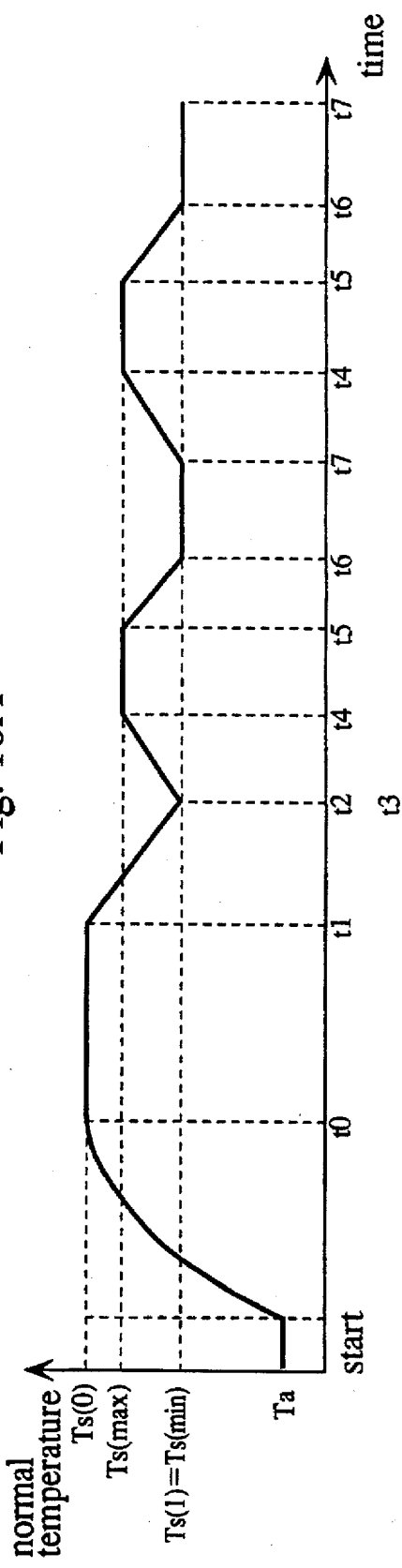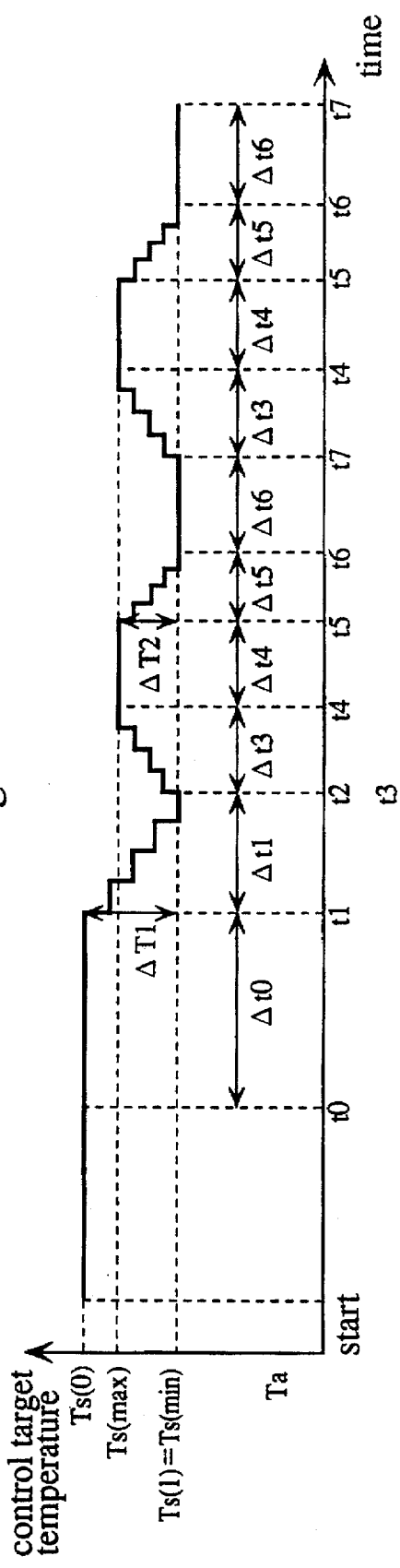

Fig. 14

| temperature scale | M1 | M2 | M3 | M4 | M5 |
|---|---|---|---|---|---|
| power supply off temperature | 30°C | 40°C | 50°C | 60°C | 70°C | control table

| temperature scale | transitional period | repetition pattern |
|---|---|---|
| M2 | two-time power supply at M1 | one-time power supply at M2 and M1 |
| M3 | three-time power supply at M2 | one-time power supply at M3 and M2 |
| M4 | three-time power supply at M3 | one-time power supply at M4 and M3 |
| M5 | three-time power supply at M4 | one-time power supply at M5 and M4 |

TEMPERATURE CONTROL DEVICE OF A HEATING OR COOLING APPARATUS FOR SAVING ENERGY

BACKGROUND OF THE INVENTION

(1) Field of the Invention

The present invention relates to a temperature control device of a heating or cooling apparatus for saving energy which is needed during its operation.

(2) Description of the Prior Art

In order to save energy of a heating or cooling apparatus, a control method employing characteristic of thermal perception of a human body has been used. An example is disclosed in Japanese Laid-open Patent Application No. 3-207949: during cooling, energy is saved by maintaining a room temperature higher than a temperature set by a person in a room (set temperature) by changing room temperature and stimulating air current. This method is utilizing characteristic of thermal perception of a human body: a human body feels cooler on receiving air current stimulus even though room temperature is maintained at a certain value.

However, this method has a problem: perception of coolness depends on his/her positions in the room, so comfort was not necessarily guaranteed when room temperature goes up higher than the set temperature during cooling. The reason is that air speed depends on the positions in the room since air speed is not the same due to patricians like furniture, and air speed blown out of a temperature control device of a heating or cooling apparatus decreases.

Therefore, the conventional method of stimulating air current could not necessarily guarantee comfort in the room, saving energy.

SUMMARY OF THE INVENTION

It is an object of the present invention to provide a temperature control device which realizes energy-saving operation of a heating or cooling apparatus, guaranteeing comfort of a person in a room by a method applicable to heating and cooling, no matter where the person is in the room.

Another object of the present invention is to provide a temperature control device which realizes energy-saving operation of a heating or cooling apparatus for a long time without damaging comfort of a person in a room.

A further object of the present invention is to provide a temperature control device which realizes energy saving operation of a heating apparatus without damaging comfort of a person in a room in a relatively easy temperature control method of turning on and off electricity to an exothermic body, the method being used in an electric carpet and the like.

(1) A temperature control device of a heating apparatus comprising: an input unit for receiving input of a set temperature; a heating unit for raising temperature of a medium, from which a person receives heat; a set temperature reaching unit for controlling the heating unit so that temperature of the medium is raised to the set temperature and maintained afterwards; a time judgement unit for judging whether a given time has passed after the temperature of the medium is raised to the set temperature; and an imperceptible temperature change unit for controlling the heating unit, if the time judgement unit judges that the given time has passed, so that the temperature of the medium drops by an amount within a given range by which human beings cannot perceive changes in temperature at a temperature change rate by which human beings cannot perceive changes in temperature.

(2) A temperature control device of a cooling apparatus comprising: an input unit for receiving a set temperature; a cooling unit for dropping temperature of a medium, from which a person receives heat; a set temperature reaching unit for controlling the cooling unit so that temperature of the medium is dropped to the set temperature and maintained afterwards; a time judgement unit for judging whether a given time has passed after the temperature of the medium is dropped to the set temperature; and an imperceptible temperature change unit for controlling the cooling unit, if the time judgement unit judges that the given time has passed, so that the temperature of the medium rises by an amount within a given range by which human beings cannot perceive changes in temperature at a temperature change rate by which human beings cannot perceive changes in temperature.

After room temperature is set by the person in the room, these devices drop it by an imperceptible amount during heating and raise it by an imperceptible amount during cooling: Thanks to the imperceptible changes, the heating or cool apparatus operates with less amount of energy than they operate at the set temperature, maintaining comfort of the person in the room.

(3) The imperceptible temperature change unit may comprise: a critical temperature storage unit for storing critical temperature change rate during heating, above which human beings can perceive changes in temperature, and critical temperature change range during heating, beyond which human beings can perceive changes in temperature; and a temperature control unit for reading out the critical temperature change rate and range from the critical temperature storage unit and controlling the heating unit so that the temperature of the medium drops according to the rate and range.

(4) The imperceptible temperature change unit may comprise: a critical temperature storage unit for storing critical temperature change rate during cooling, above which human beings can perceive changes in temperature, and critical temperature change range during cooling, beyond which human beings can perceive changes in temperature; and a temperature control unit for reading out the critical temperature change rate and range from the critical temperature storage unit and controlling the cooling unit so that the temperature of the medium rises according to the rate and range.

According to these devices, critical values above and beyond which human beings can perceive changes in temperature are stored in exclusive areas, and temperature control is carried out based on the critical values. Therefore, if more suitable values are found, they can be easily updated.

(5) The set temperature reaching unit may control the heating unit so that the temperature of the medium is raised with a greater temperature change rate than the temperature change rate used by the imperceptible change unit.

(6) The set temperature reaching unit may control the cooling unit so that the temperature of the medium is dropped with a greater temperature change rate than the temperature change rate used by the imperceptible change unit.

According to these devices, room temperature is set with a great temperature change rate and then dropped by an amount within the critical temperature change range with a small temperature change rate during heating; room temperature is set with a great temperature change rate and then raised by an amount within the critical temperature change range with a small temperature change rate during cooling. Accordingly, the person in the room can enjoy comfort right after the start of heating/cooling operation, with the temperature change range being wider than that in (1) and (2).

(7) The temperature control device of (5) may further comprise an up-and-down change unit for controlling the heating unit so that the temperature of the medium repeats up-and-down change pattern for suppressing changes in human body temperature, which happen after the drop of temperature of the medium is caused by the imperceptible temperature change unit.

(8) The temperature control device of (6) may further comprise an up-and-down change unit for controlling the cooling unit so that the temperature of the medium repeats up-and-down change pattern for suppressing changes in human body temperature, which happen after the rise of temperature of the medium is caused by the imperceptible temperature change unit.

According to these devices, after room temperature is changed at a first stage, it is changed based on a predetermined change pattern at a second stage so that changes in human body temperature is controlled. Then a person in a room can enjoy comfort for a long time, with the energy for operation of a heating/cooling apparatus being saved.

(9) The up-and-down change unit may comprise: a change pattern storage unit for storing a highest limit temperature, lowest limit temperature and cycle during heating, all of which specify a predetermined up-and-down change pattern based on changes in human body temperature, which happen after the drop of temperature of the medium is caused by the imperceptible temperature change unit; and a temperature change unit for reading out the highest limit temperature, lowest limit temperature and cycle from the change pattern storage unit and controlling the heating unit so that the temperature of the medium repeats the up-and-down change pattern based on the highest and lowest limit temperatures and cycle.

(10) The up-and-down change unit may comprise: a change pattern storage unit for storing a highest limit temperature, lowest limit temperature and cycle during cooling, all of which specify a predetermined up-and-down change pattern based on changes in human body temperature, which happen after the rise of temperature of the medium is caused by the imperceptible temperature change unit; and a temperature change unit for reading out the highest limit temperature, lowest limit temperature and cycle from the change pattern storage unit and controlling the cooling unit so that the temperature of the medium repeats the up-and-down change pattern based on the highest and lowest limit temperature and cycle.

According to these devices, change patterns after the room temperature change is stored in exclusive areas, and temperature control is carried out based on the change patterns. Therefore, if more suitable patterns are found, they can be easily updated.

(11) The cycle stored in the change pattern storage unit may be characterized by: a first time period for raising the temperature of the medium from the lowest limit temperature to the highest limit temperature; a second time period for maintaining the temperature of the medium at the highest limit temperature; a third time period for dropping the temperature of the medium from the highest limit temperature to the lowest: limit temperature; and a fourth time period for maintaining the temperature of the medium at the lowest limit temperature.

(12) The cycle stored in the change pattern storage unit may be characterized by: a first time period for raising the temperature of the medium from the lowest limit temperature to the highest limit temperature; a second time period for maintaining the temperature of the medium at the highest limit temperature; a third time period for dropping the temperature of the medium from the highest limit temperature to the lowest limit temperature; and a fourth time period for maintaining the temperature of the medium at the lowest limit temperature.

According to these devices, the up-and-down change pattern comprises a cycle which is characterized by four time periods obtained from an experiment. Therefore, room temperature changes according to the pattern which suppresses changes in human body temperature more precisely so that the person in the room can enjoy comfort for sure.

(13) The lowest limit temperature stored in the change pattern storage unit may equal the temperature of the medium, which is dropped by the imperceptible temperature change unit, and the highest limit temperature stored in the change pattern storage unit may be above the lowest limit temperature and below the set temperature.

(14) The lowest limit temperature stored in the change pattern storage unit may be above the set temperature and below the temperature of the medium, which is raised by the imperceptible temperature change unit, and the highest limit temperature stored in the change pattern storage unit may be above the temperature of the medium, which is raised by the imperceptible temperature change.

According to these device, up-and-down changes in room temperature happens within a change range which is imperceivable and more economical compared to the case in which room temperature is changed according to the set temperature. Therefore energy saving operation continues without damaging comfort of the person in the room even after the economical room temperature change.

(15) The heating unit comprises: an exothermic unit for generating heat; a temperature detection unit for detecting temperature of the exothermic unit; a power supply unit for supplying power to the exothermic unit; and a switch unit for turning on/off the power to the exothermic unit from the power supply unit, and the imperceptible temperature change unit comprises: a power parameter storage unit for storing a combination of power supply off temperature of the exothermic unit and number of times of turning off the switch unit at that power supply off temperature for dropping the temperature of the medium within the critical temperature change range with the critical temperature change rate; and a switch control unit for reading out the turn-off temperature and number of times from the power parameter storage unit, turning off the switch unit in accordance with the number of times when the temperature detected by the temperature detection unit reaches the power supply off temperature and turning on the switch unit in accordance with the number of times when a given time period has passed afterwards.

According to this device, temperature is changed according to a predetermined power supply off temperature and number of times. Therefore, a predetermined temperature change is carried out for sure regardless of environment around the device.

BRIEF DESCRIPTION OF THE DRAWINGS

These and other objects, advantages and features of the invention will become apparent from the following description, thereof taken in conjunction with the accompanying drawings which illustrate a specific embodiment of the invention. In the drawing:

FIG. 10A is a graph showing changes in room temperature during heating in Embodiment 2.

FIG. 10B is a graph showing changes in control target temperature during heating in Embodiment 2.

FIG. 14 shows relation between temperature scale and power supply off temperature in a temperature control device of Embodiment 3.

DESCRIPTION OF THE PREFERRED EMBODIMENTS (Embodiment 1)

Figure 1:
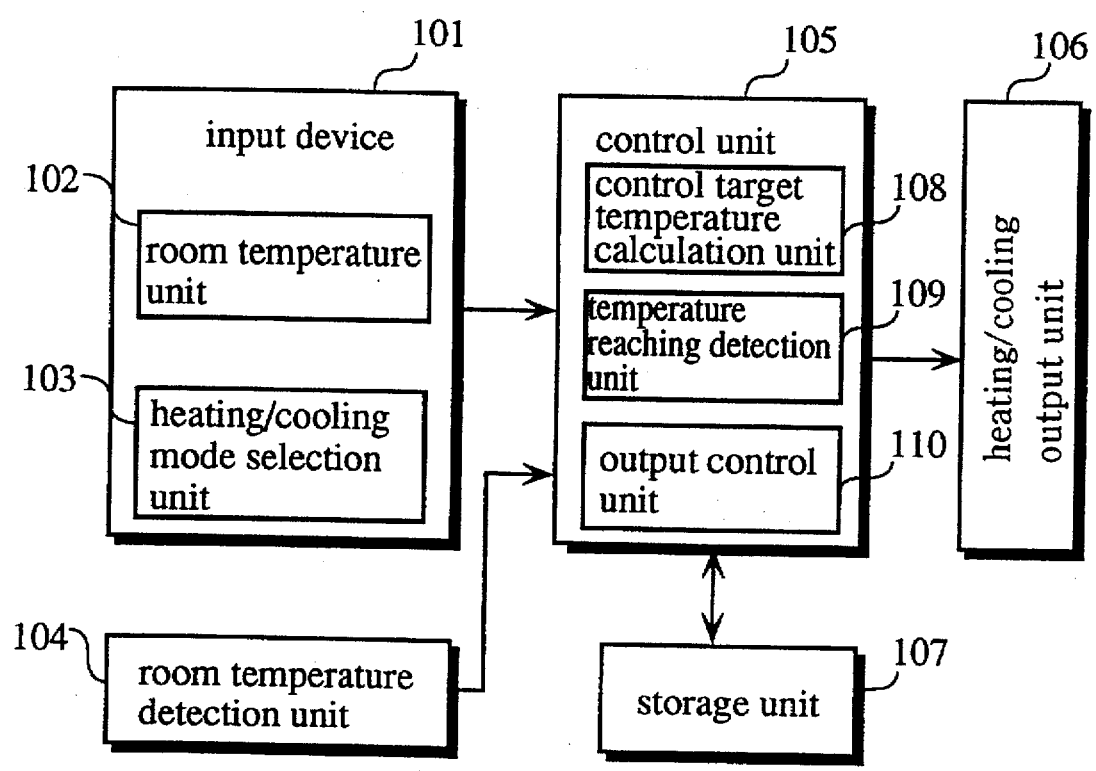
FIG. 1 is a block diagram of construction of a temperature control device of a heating or cooling apparatus of Embodiment 1 of the present invention.

FIG. 1 is a block diagram of a temperature control device of a heating or cooling apparatus of Embodiment 1 of the present invention.

The present device comprises control unit 105 as a core, input device 101, room temperature detection unit 104, storage unit 107, and heating/cooling output unit 106.

Input device 101 comprises room temperature setting unit 102 for receiving temperature set by a person in a room (set temperature), heating/cooling mode selection unit 103 for selecting heating/cooling mode, and an instruction unit (not illustrated) for starting the room temperature control of the present invention. Input device 101 employs remote control method for input so that information about room temperature and mode set by the person in the room is transmitted to control unit 105 through radio.

Room temperature detection unit 104 is formed by a thermistor. This unit 104 is attached to an air suction port (not illustrated) attached to heating/cooling output unit 106, detecting room temperature and transmitting it to control unit 105 all the time. The room temperature detected by this unit is referred to as "detected room temperature" hereinafter.

Storage unit 107 comprises a read only memory (ROM) and a random access memory (RAM), and stores a program defining procedure of control unit 105. The procedure is shown in flowcharts in FIGS. 2, 4, and 5.

Also, storage unit 107 stores critical range and rate of temperature change (Wb values), which can be perceived by human beings. Human beings cannot perceive any changes in temperature if it happens below the critical rate and within the critical range, both of which are verified by Weber's law. According to Weber's law, human beings cannot perceive changes in temperature up to a certain degree on receiving thermal stimulus (changes in room temperature). (Shinsuke Muto, "Measuring Psychology", 1982, published by Asakura Shoten). Wb values are obtained from references (e.g. "ergonomics standard values and formulas handbook" compiled under the supervision of Michihiko Sato, published by Gihoudou Shuppan) and experiments. For example, threshold value of temperature increase rate which can be perceived by a human being at room temperature $25°$ C. is $0.001°$ C./sec, and that of temperature decrease rate is $0.004°$ C./sec. Like this, Wb values are a set of data comprising room temperature and threshold value of temperature increase rate and decrease rate at that room temperature.

Moreover storage unit 107 stores temporary temperature data calculated by control unit 105.

Control unit 105 is mainly formed by a micro processor. This unit 105 comprises control target temperature calculation unit 108, temperature reaching detection unit 109, and output control unit 110. These units operate according to the program in storage unit 107.

Control target temperature calculation unit 108 calculates control target temperature based on Wb values in storage unit 107, the control target temperature changing monotonously as time goes by. Control target temperature is temporarily used as target of temperature control. At this time, Wb values are decided by mode selected by heating/cooling mode selection unit 103 and room temperature at that time.

Output control unit 110 controls output of heating/cooling output unit 106, comparing the calculated control target temperature and the detected room temperature, so that the their difference becomes zero.

Temperature reaching detection unit 109 judges whether room temperature has reached the control target temperature or final target temperature in storage unit 107.

Control unit 105 has a built-in timer (not illustrated) so that it can calculate elapsed time and judge passage of time.

Heating/cooling output unit 106 is composed of a compressor, a heat exchanger, an expansion valve, an inverter, and the like. This unit 106 adjusts air temperature to be blown into the room based on a signal from output control unit 110.

The following explanation is about control unit 105 of the temperature control device of the heating or cooling apparatus of Embodiment 1 of the present invention constituted in the above way. The procedure is explained by means of flowcharts in FIGS. 2, 4, and 5.

Figure 4:
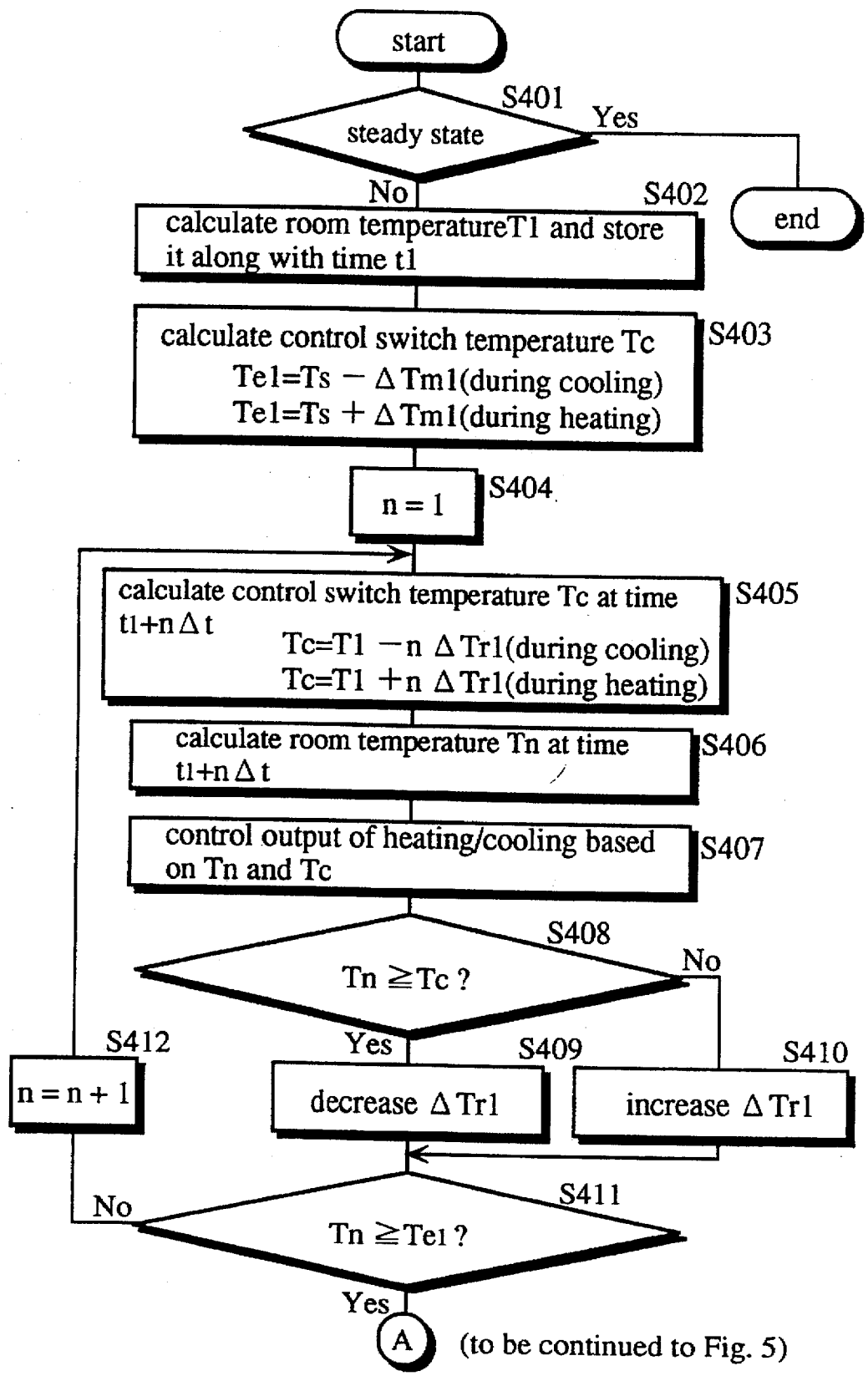
FIG. 4 is a former half of a flowchart showing procedure of controlling room temperature in a second case in which there is a large difference between room temperature and set temperature in Embodiment 1.
Figure 5:
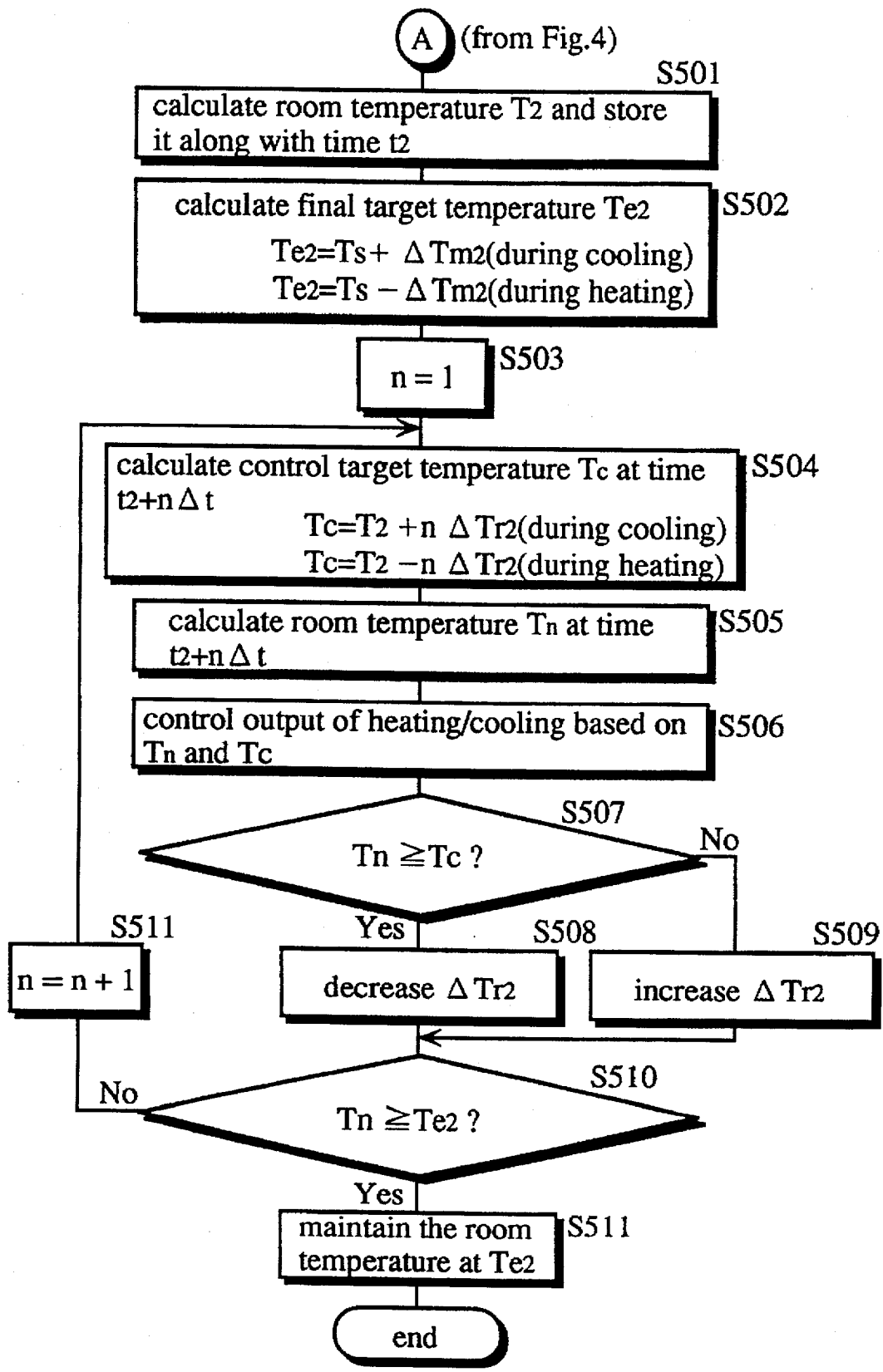
FIG. 5 is a latter half of a flowchart showing procedure of controlling room temperature in the second case.

The procedure is categorized into two cases by room temperature at the start of the control: a first case in which room temperature is maintained at set temperature beforehand (FIG. 2); and a second case in which the temperature control device is not in a steady state and there is a large difference between room temperature and the set temperature (FIGS. 4 and 5).

The First Case in Which the Temperature Control Device is in a Steady State

Figure 2:
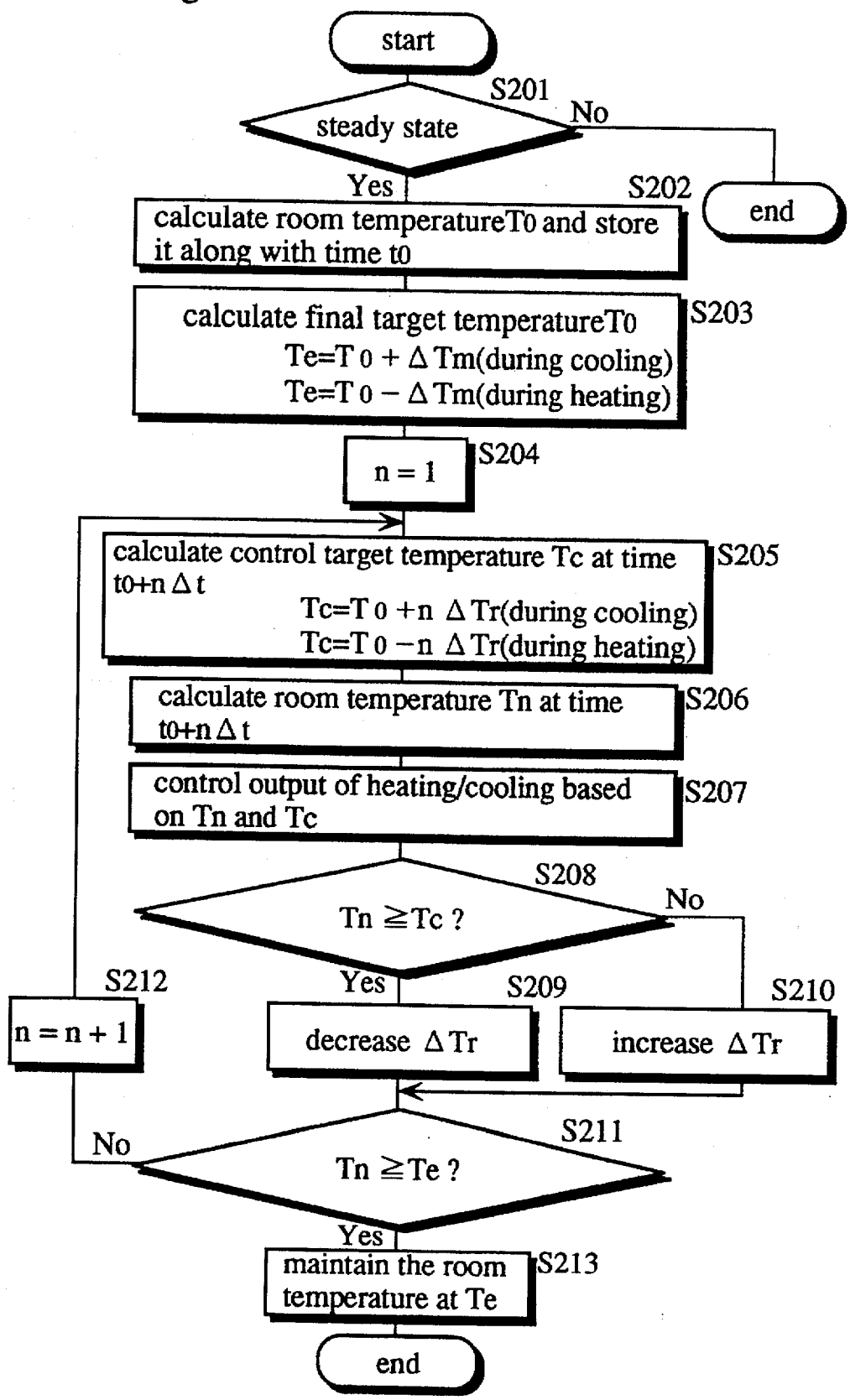
FIG. 2 is a flowchart showing procedure of controlling room temperature in a first case in which the temperature control device is in a steady state in Embodiment 1.

FIG. 2 is a flowchart showing the procedure of a first case in which the temperature control device is in a steady state.

When a person in a room instructs the temperature control device to start the procedure, using input device 101, control unit 105 judges whether the temperature control device is in a steady state: whether the detected temperature is closed to set temperature Ts which is set by room temperature setting unit 102 beforehand (e.g. within a range of ±0.5° C.)(Step 201).

If the temperature control device is not in a steady state, the procedure end, which means it does not start at all. If the present device is in a steady state, the following control is carried out.

Control unit 105 measures room temperature T0 and stores it along with time t0, T0 and t0 being values at the start of the control (Step 202).

Control unit 105 stores temperature, which is higher than room temperature T0 by a given temperature $\Delta Tm$ (e.g. 1.0° C.) during cooling and lower during heating, in storage unit 107. The temperature is referred to as final target temperature Te (Step 203).

$\Delta Tm$ is the widest temperature change range within which human beings cannot perceive changes in room temperature, the widest temperature change range being stored in storage unit 107 beforehand as values at each room temperature by an experiment.

After counter n is initialized to 1, the counter n controlling output of heating/cooling output unit 106 at every given time interval $\Delta t$ (Step 204), control target temperature calculation unit 108 calculates control target temperature Tc at time $t0+n\Delta t$ (Step 205). Control target temperature Tc is set to $T0+n\Delta Tr$ based on Wb values in storage unit 107.

The reason target temperature change rate is set to $\Delta Tr/\Delta t$ is to change the room temperature with temperature change rate which cannot be perceived by human beings. $\Delta Tr/\Delta t$ is set below Wb values in storage unit 107.

Control unit 105 judges time $t0+n\Delta t$ by its timer, and measures room temperature Tn at that time (Step 206).

Output control unit 110 controls output of heating/cooling output unit 106 based on room temperature Tn and control target temperature Tc so that difference between Tn and Tc becomes zero (Step 207).

Control unit 105 judges which of room temperature Tn and control target temperature Tc is higher (Step 208), decreases $\Delta Tr$ if room temperature Tn is higher (Step 209), and increases $\Delta Tr$ if room temperature Tn is lower (Step 210).

The reason why $\Delta Tr$ is changed based on the judgement in Step 208 is to bring room temperature Tn closer to control target temperature Tc as early as possible. The values of $\Delta Tr/\Delta t$ are limited so that they will not be above Wb values.

Temperature reaching detection unit 109 judges whether room temperature Tn has reached final target temperature Te stored in storage unit 107 (Step 211).

When room temperature Tn has not reached final target temperature Te, control unit 105 adds 1 to counter n in order to continue the room temperature change until room temperature Tn reaches control target temperature Te. Then control unit 105 repeats Steps 205–211 (Step 212).

On the other hand, when Tn has reached Te, control unit 105 controls output of heating/cooling output unit 106 in order to maintain room temperature at Te (Step 213).

The following explanation is about how room temperature changes when output of heating/cooling output unit 106 is controlled. It is explained by means of FIGS. 3A and 3B.

Figure 3A:
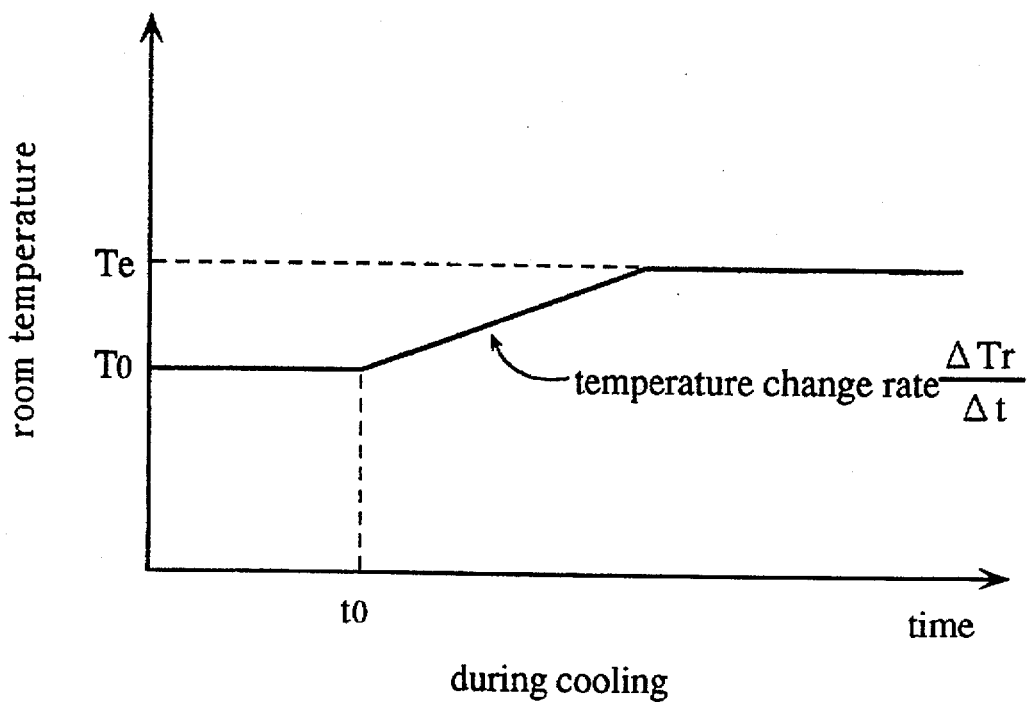
FIG. 3A is a graph showing changes in room temperature during cooing when room temperature control is executed in the first case.
Figure 3B:
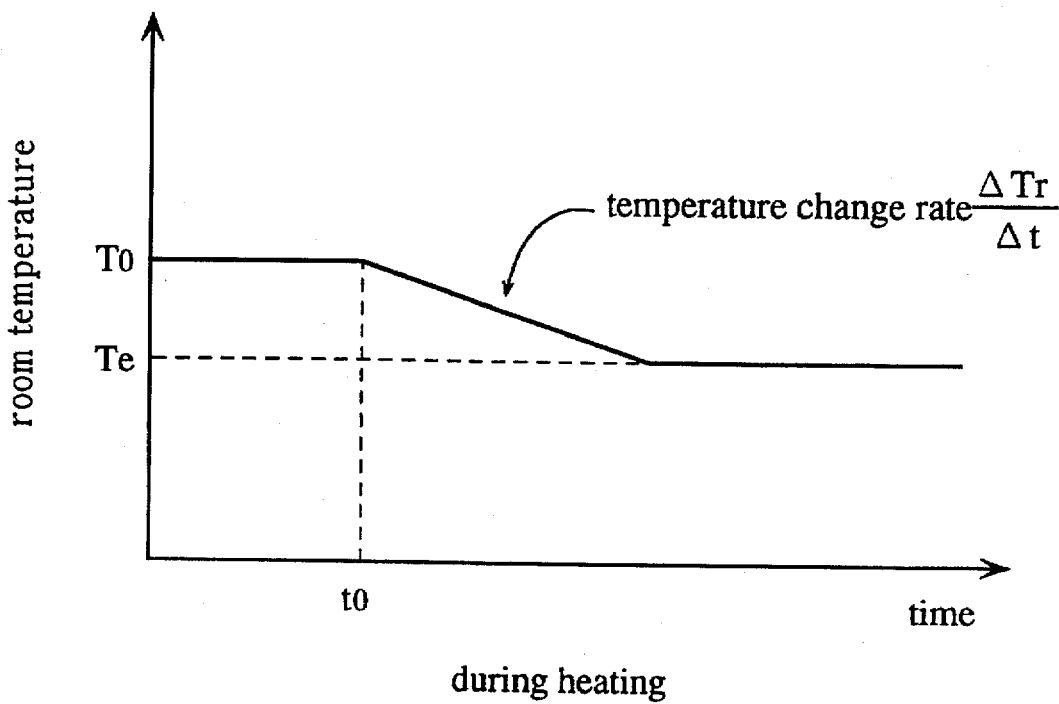
FIG. 3B is a graph showing changes in room temperature during heating when room temperature control is executed in the first case.

FIG. 3A shows changes in room temperature during cooling and FIG. 3B shows those during heating. When input device 101 starts the control procedure at time t0, room temperature which has been maintained at temperature T0 in steady state goes up during cooling and goes down during heating. The temperature change rate at this time is set to $\Delta Tr/\Delta t$. They do not go above Wb values. When the room temperature reaches final target temperature Te, it is maintained afterwards.

According to an experiment during cooling of the present embodiment, when room temperature rises 1° C. with room temperature change rate being 3° C./h, nine people out of ten didn't feel the changes in room temperature. That proves higher room temperature can be maintained without damaging comfort of a person in a room. Therefore, energy can be saved.

The Second Case in Which There is a Large Difference Between the Room Temperature and the Set Temperature The following explanation is about the second case in which the temperature control device is not in a steady state at the start of control.

FIG. 4 and FIG. 5 show flowcharts showing control procedure.

When a person in a room instructs the temperature control device to start the procedure, using input device 101, control unit 105 judges whether the temperature control device is in a steady state: whether it is necessary to drop the room temperature during cooling or raise it during heating. Specifically, control unit 105 judges whether the room temperature is higher than temperature TSh during cooling (e.g. Ts+0.5° C.) or lower than temperature Ts1 during heating (e.g. Ts-0.5° C.), TSh being higher than set temperature Ts by a given temperature and Ts1 being lower than Ts by a given temperature (Step 401).

When room temperature is lower than Tsh during cooling or higher than Ts1 during heating, the present control ends, with no control happening.

On the other hand, when room temperature is higher than Tsh during cooling or lower than Ts1 during heating: when cooling or heating is necessary as there is a large difference between room temperature and set temperature Ts; the following control is carried out.

Control unit 105 measures room temperature T1 and stores it along with time t1, T1 and t1 being values at the start of the control (Step 402).

Control unit 105 calculates control switch temperature Te1 to be used as a final target temperature at a first-step room temperature control and stores it in storage unit 107, Te1 being lower then Ts by a given $\Delta Tm1$ (e.g. 1.0° C.) during cooling and higher than Ts by $\Delta Tm1$ during heating. (Step 403).

$\Delta Tm1$ is stored in storage unit 107 beforehand.

Control unit 105 changes the room temperature until it reaches control switch temperature Te1 as a first-step temperature control. The procedure is basically the same as Steps 204-212 in the flowchart in FIG. 2, so the explanation is omitted (Steps 404-412).

However, one thing is different from the procedure in FIG. 2: temperature change rate $\Delta Tr1/\Delta t$ at the first-step room temperature control is always greater than Wb values. The purpose is to change the room temperature with room temperature change rate which can be perceived by human beings clearly so that a person in a room notices changes in room temperature and can enjoy comfort.

When the room temperature reaches control switch temperature Te1, control unit 105 starts a second-step temperature control, making the dropped room temperature go up and the raised room temperature go down.

Room temperature detection unit 104 calculates room temperature T2, and control unit 105 stores it along with t2, T2 and t2 being values at the start of the control (Step 501).

Control unit 105 calculates final target temperature Te2, which is higher than set temperature Ts by a given temperature $\Delta Tm2$ (e.g. 1.0° C.) during cooling and lower during heating (Step 502).

After changing the room temperature to final target temperature Te2 with temperature change rate $\Delta Tr2/\Delta t$ which cannot be perceived by human beings, control unit 105 maintains the room temperature at final target temperature Te. As the control procedure is the same as that in FIG. 2 (Steps 204-213), explanation is omitted here (Steps 503-512).

In the first-step temperature control, room temperature is changed with a large change which can be perceived by human beings.

In the second-step temperature control, room temperature is changed with a small change which cannot be perceived by human beings.

Figure 6A:
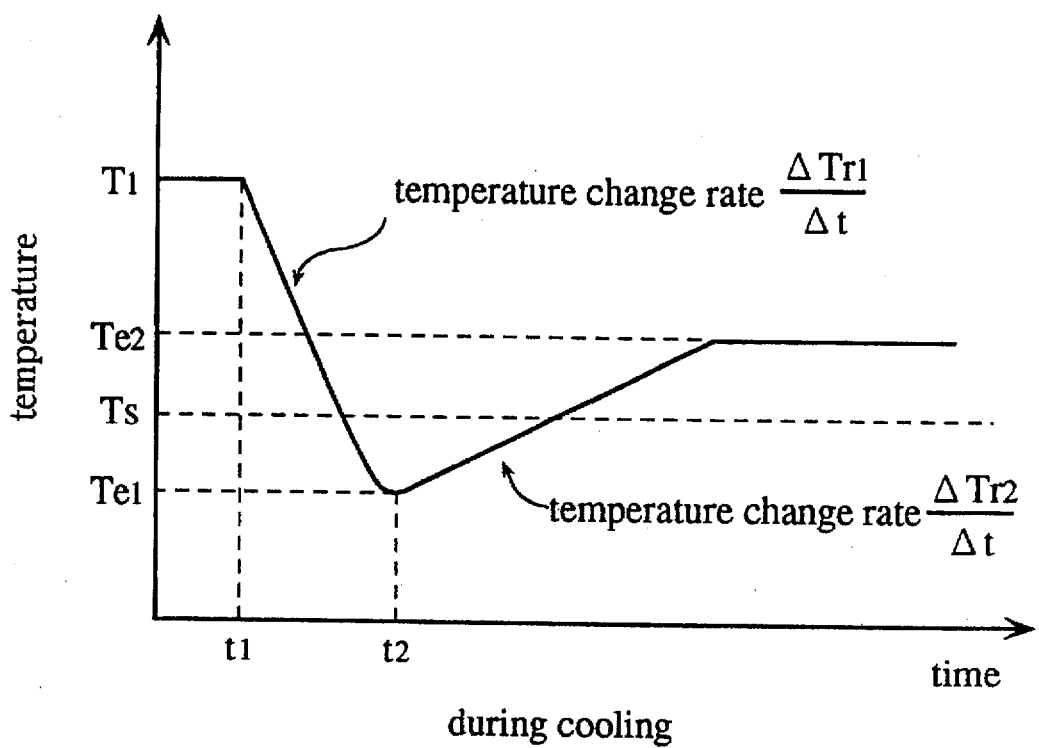
FIG. 6A is a graph showing changes in room temperature during cooling when room temperature control is executed in the second case.
Figure 6B:
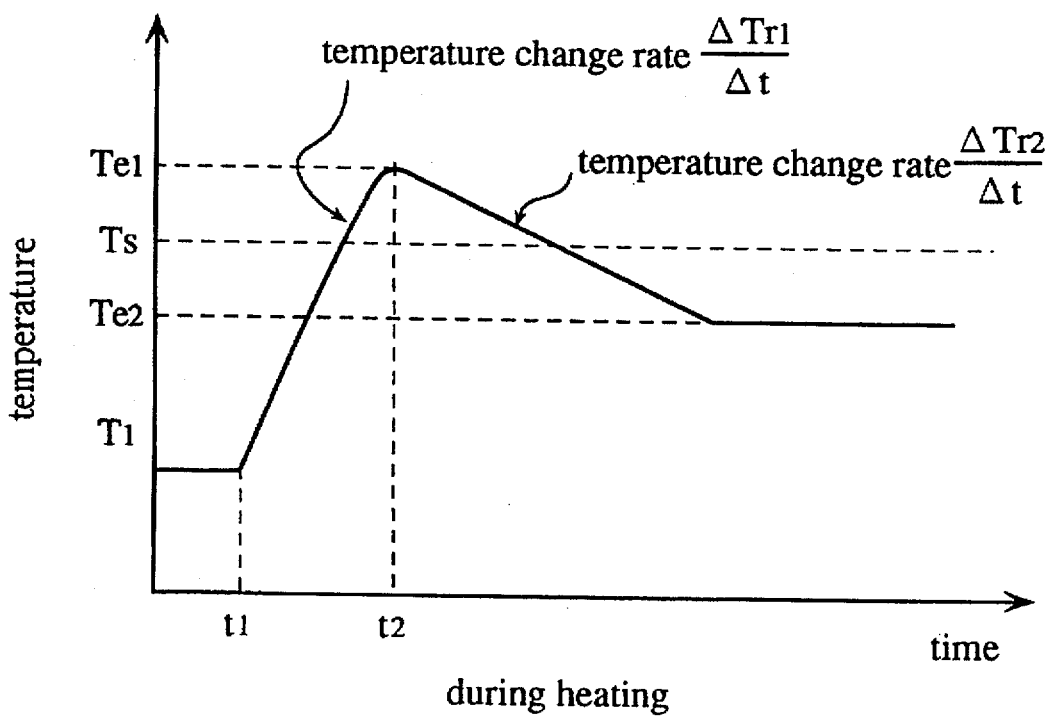
FIG. 6B is a graph showing changes in room temperature during heating when room temperature control is executed in the second case.

Graphs of FIG. 6A and FIG. 6B show changes in room temperature when output of heating/cooling output unit 106 is controlled by the above procedure.

FIG. 6A shows changes in room temperature during cooling and FIG. 6B shows those during heating.

When input device 101 starts the procedure at time t1, room temperature T1 goes down during cooling and goes up during heating by the first-stage room temperature control. At this time, room temperature changes with the room temperature change rate being $\Delta Tr1/\Delta t$, which can be clearly perceived by human beings.

When the room temperature reaches temperature Te1 at time t2, the dropped room temperature goes up, and the raised room temperature goes down. The room temperature changes with the temperature change rate being $\Delta Tr2/\Delta t$, which cannot be perceived by human beings.

When the room temperature reaches to final target temperature Te2, it is maintained afterwards.

According to an experiment during heating of the present embodiment, when the temperature control device of the present heating or cooling apparatus is controlled, with room temperature T1 at the start of the control T1 being 18° C., set temperature Ts being 20° C., control switch temperature Te1 being 22° C., final target temperature Te2 being 19° C., all the ten experimental subjects could perceive the same warmth as perceived by the conventional control method, in which room temperature was monotonously changed from 18° C. to 20° C.

Therefore, comfort was not damaged even though the final target temperature of the control is lower than the set temperature by 1° C.

In the present embodiment, room temperature control was started by operation of input device 101 by a person. However, other methods can be employed. For example, after control unit 105 detects that the temperature control device reached a steady state for the first time, such room temperature control can be started automatically when a given time has passed.

(Embodiment 2)

A temperature control device of Embodiment 2 is an improvement of the temperature control device of Embodiment 1 from the viewpoint of energy saving. Before explaining the present device specifically, the significance of the present device in comparison with the temperature control device in Embodiment 1 is clarified as follows.

According to the device of Embodiment 1, energy can be saved without damaging comfort of a person in a room for a while by maintaining the room temperature after changing it economically.

But in Embodiment 1, changes in skin temperature after room temperature is changed was not taken care of. So, the comfort of a person was maintained for a while but not for a long time.

Figure 12A:
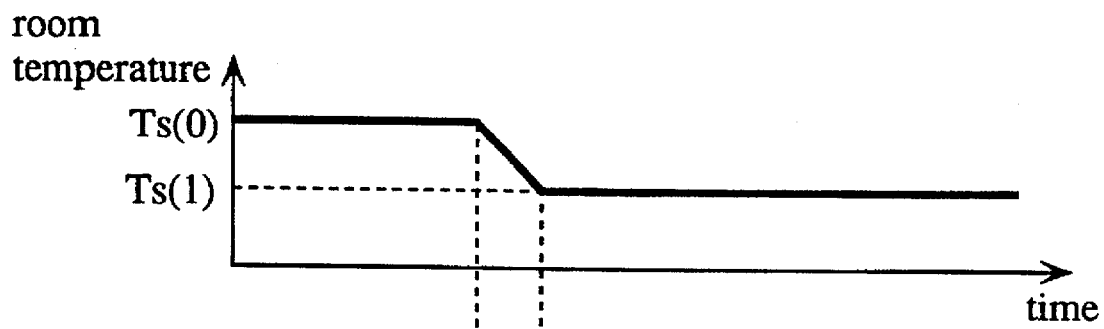
FIG. 12A is a graph showing changes in room temperature in an experiment of dropping room temperature during heating.
Figure 12B:
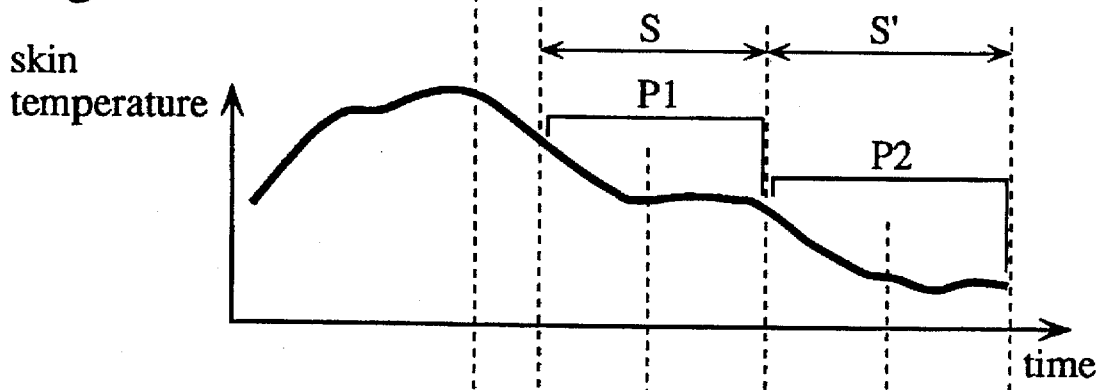
FIG. 12B is a graph showing changes in skin temperature of experimental subjects.

FIG. 12A and FIG. 12B show how skin temperature changed in an experiment after temperature is changed during heating by the temperature control device of Embodiment 1. FIG. 12A shows room temperature and FIG. 12B shows average of changes in skin temperatures of experimental subjects. Skin temperature goes down during time period t1-t3 along with the drop of the room temperature during time period t1-t2, and is maintained at a certain value for a while. Therefore, the experimental subjects can enjoy comfort as long as the skin temperature does not further goes down.

However, the skin temperature further goes down during time period t2'-t3' even though the room temperature is maintained. That means human body temperature keeps going down as time goes by. So the method of changing temperature only cannot maintain comfort of a person in a room for a long time, which means energy saving is not realized.

The temperature control device of Embodiment 2 is an improvement of that of Embodiment 1. Once energy is saved by the economical temperature change in operation of air-conditioning equipment, the energy saving can be continued without damaging comfort of a person in a room.

Construction

Figure 7:
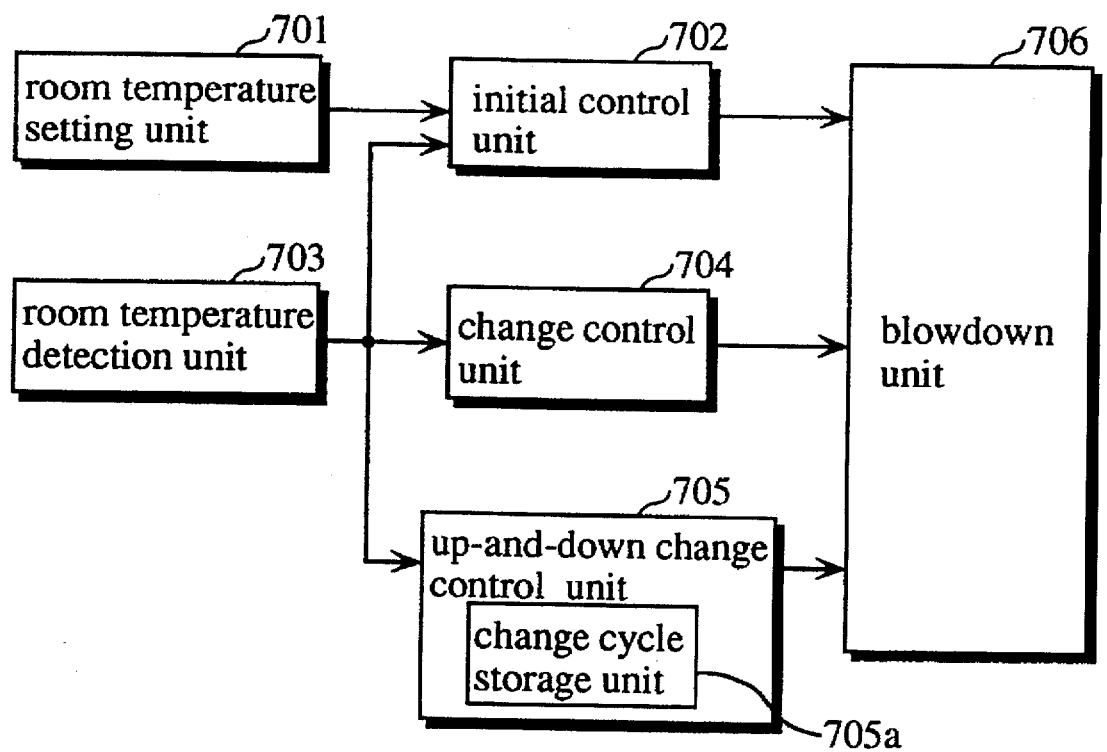
FIG. 7 is a block diagram showing construction of a temperature control device of a heating or cooling apparatus of Embodiment 2 of the present invention.

FIG. 7 shows a block diagram showing construction of a temperature control device of a heating or cooling apparatus of the present Embodiment. The temperature control device comprises room temperature setting unit 701, initial control unit 702, room temperature detection unit 703, change control unit 704, up-and-down change control unit 705 and blowdown unit 706.

Room temperature detection unit 703 is formed by a thermistor and the like. This unit 703 detects room temperature.

Blowdown unit 706 outputs control signals to a compressor and a fan of an air conditioner (not illustrated in FIG. 7), and adjusts temperature and amount of air blown out of the air conditioner, according to instructions from initial control unit 702 and change control unit 704 or up-and-down change control unit 705.

Room temperature setting unit 701 is formed by a remote control and the like, which is for a person in a room to set temperature. This unit 701 receives input of the set temperature. The set temperature received by this unit 701 is outputted to initial control unit 702 every time it is set by the person in the room; or temporarily stored in room temperature setting unit 701 and outputted to initial control unit 702 if necessary.

Initial control unit 702 controls blowdown unit 706 so that the room temperature detected by room temperature detection unit 703 is set to the set temperature. Also, this unit 702 judges whether operation mode of the present temperature control device is heating or cooling by comparing the detected temperature and set temperature at the start of the control, and transmits the result to change control unit 704 and up-and-down change control unit 705. This unit 702 repeatedly judges whether the detected room temperature has reached to the set temperature, and activates change control unit 704 when it has reached.

Change control unit 704 controls blowdown unit 706 so that room temperature goes down during heating and goes up during cooling, the temperature change being opposite to that by initial control unit 702, with temperature range and temperature change rate which cannot be perceived by human beings. These temperature range and temperature change rate are stored in ROM (not illustrated in FIG. 7) in change control unit 704. This unit 704 activates up-and-down change control unit 705 when it judges that the temperature change has ended, monitoring detected room temperature.

Up-and-down change control unit 705 controls blowdown unit 706 so that a given highest limit temperature and lowest limit temperature alternate in the room. During heating, this unit 705 recognizes temperature changed by change control unit 704 as lowest limit temperature and temperature which is higher than the lowest limit and lower than the set temperature as highest limit temperature. During cooling, this unit 705 recognizes temperature lower than the temperature changed by change control unit 704 and higher than the set temperature as lowest limit temperature and temperature which is higher than the temperature changed by change control unit 704 as highest limit temperature.

Specifically, lowest limit temperature Tmin and highest limit temperature Tmax can be defined in the following way, with the set temperature being T0, the temperature changed by change control unit 704 being T1.

During heating, even though T0>T1 is true, the following equations are true.

$$Tmin = T1$$

$$Tmax = Tmin + K1(T0 - Tmin) \quad (0 < K1 \leq 1)$$

During cooling, even though T0<T1 is true, the following equations are true.

$$Tmin = T0 + K2(T1 - T0) \quad (0 \leq K2 < 1)$$

$$Tmax = T1 + K3 \quad (0 < K3)$$

The above K1, K2, and K3 are stored in ROM (not illustrated) in up-and-down change control unit 705 beforehand.

Change cycle storage unit 105a stores four time periods which constitute one cycle in which the highest limit temperature and the lowest limit temperature alternate: a first time period for changing the room temperature from the lowest to highest limit; a second time period for maintaining the room temperature which has reached the highest limit; a third time period for changing the room temperature from the highest to lowest limit; and a fourth time period for maintaining the room temperature which has reached the lowest temperature.

Up-and-down change control unit 705 controls blowdown unit 706 so that the temperature repeats one cycle of the temperature change decided by the four time periods stored in change cycle storage unit 105a and the highest and lowest temperature.

Operation

Figure 8:
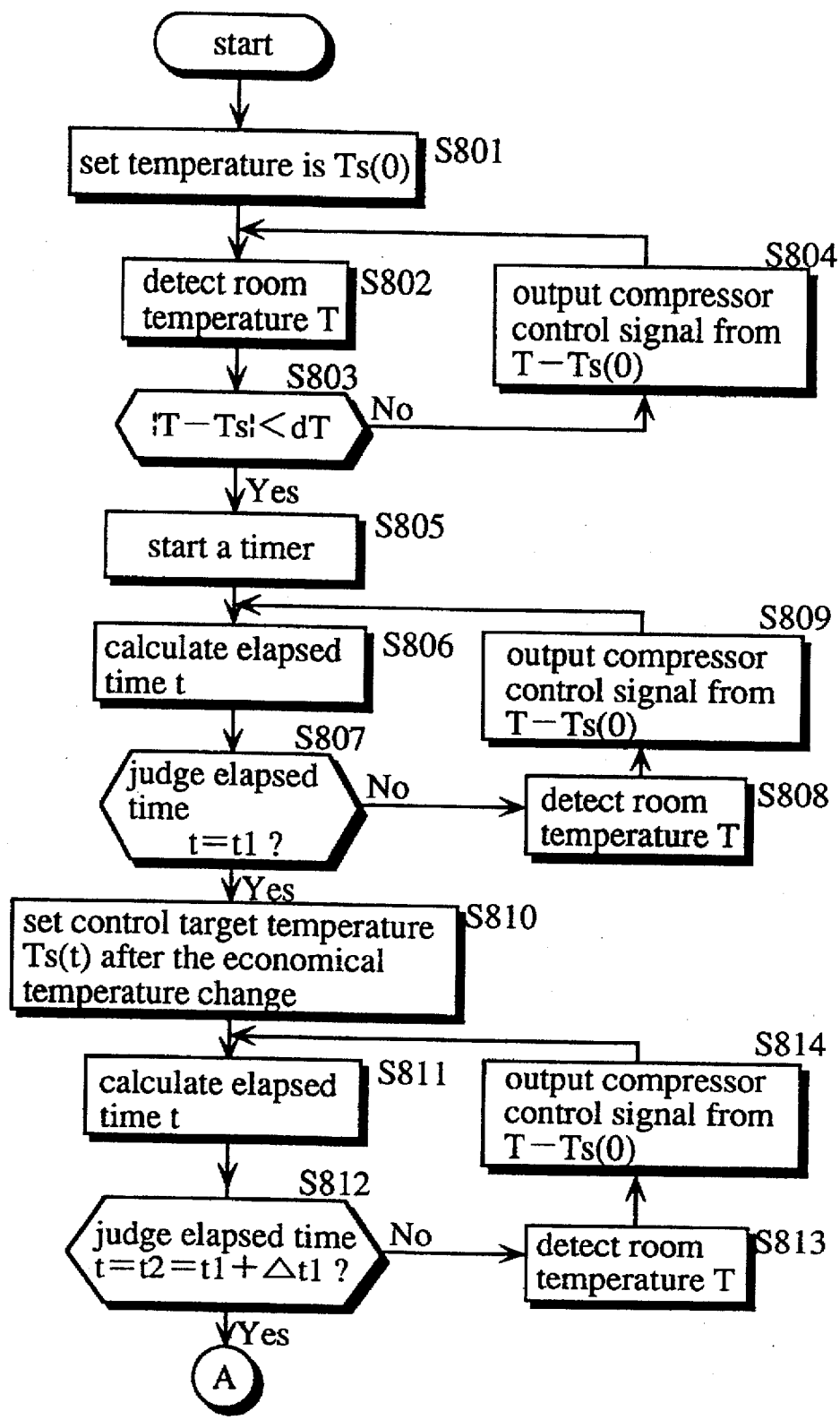
FIG. 8 is a former half of a flowchart showing operation of the temperature control device of the heating or cooling apparatus of Embodiment 2.
Figure 9:
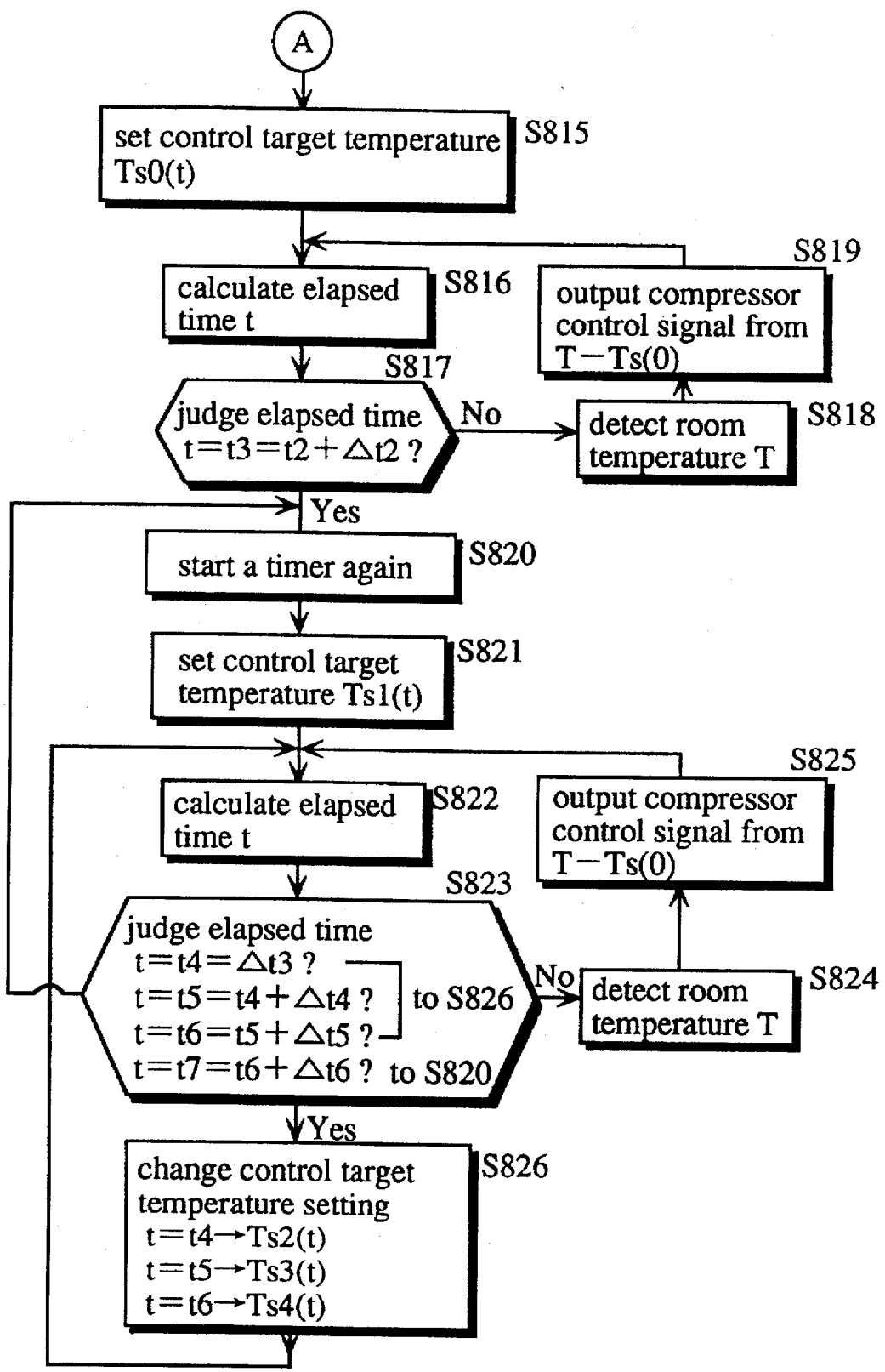
FIG. 9 is a latter half of a flowchart showing operation of the temperature control device of the heating or cooling apparatus of Embodiment 2.

The following explanation is about operation of the temperature control device constituted in the above way. FIG. 8 and FIG. 9 are flowcharts for procedure of the temperature control device of the present Embodiment.

When a set temperature Ts(0) is set by a person in a room by means of room temperature setting unit 701 (Step 801), the initial control unit 702 reads out detected room temperature T from room temperature detection unit 703 (Step 802), and judges whether their difference (|Ts(0)-T|) is smaller than a given temperature difference dT (Step 803).

If 51 Ts(0)-T|>dT is true, initial control unit 702 judges that the room temperature has not reached the set temperature and sends control information (Ts(0)-T) to blowdown unit 706. Blowdown unit 706 outputs control signals to a compressor and a fan of an air conditioner so that the detected room temperature T approaches to set temperature Ts(0) (Step 804).

If |Ts(0)-T|<dT is true, initial control unit 702 judges that the room temperature has reached the set temperature and starts the timer (Step 805).

In order to maintain the room temperature at the set temperature for a while, initial control unit 702 measures elapsed time t (Step 806), judging whether a given time t1 has passed (Step 807).

When time t1 has not passed yet (t<t1), initial control unit 702 controls blowdown unit 706 so that the detected temperature T is maintained at set temperature Ts(0) (Step 808). Then blowdown unit 706 outputs control signals based on (Ts(0)-T) to a compressor and fan (Step 809). The above mentioned control is repeated until time t has passed (Steps 806-809).

On the other hand, when the elapsed time t equals time t1, initial control unit 702 judges that room temperature has reached steady state and substantial time has passed so that a person in a room can adjust him/herself to set temperature Ts(0) physiologically. Then this unit 702 activates change control unit 704 (Step 810–814).

Activated change control unit 704 sets control target temperature Ts(t) at elapsed time t so that the room temperature gradually changes from Ts(0) to Ts(1) in time period Δt1 (Step 810). Temperature range between Ts(0) and Ts(1) is set to be the greatest so that the person in the room cannot perceive changes in temperature after he/she adjusted him/herself to a certain temperature. Then energy saving operation starts without damaging comfort of the person in the room.

Next, change control unit 704 measures elapsed time t (Step 811), and judges whether time t2 has passed (Step 812), t2 being t1+Δt1. When it has not passed yet (t<t2), change control unit 704 controls blowdown unit 706 so that detected time T always corresponds to control target temperature Ts(t) at elapse time t set in Step 810 (Steps 813 and 814), and goes back to Step 811, measuring elapsed time t. On the other hand, when time t2 has passed (t=t2), change control unit 704 judges that temperature change has ended and activates up-and-down change control unit 705 (Steps 815–826).

Activated up-and-down change control unit 705 sets lowest limit temperature Ts(min) and highest limit temperature Ts(max) to be used as control target temperatures, and sets control target temperature Ts(t) at elapsed time t so that the room temperature changes from Ts(1) to either Ts(min) or Ts(max) in given time period Δt2 (Step 815).

Next, up-and-down change control unit 705 measures elapsed time t (Step 816), judges whether time t3 has passed, t3 being t2+Δt2 (Step 817). When t3 has not passed yet (t<t3), up-and-down change control unit 705 controls blowdown unit 706 so that detected room temperature T always corresponds to control target temperature Ts(t) at elapsed time t set in Step 815 (Steps 818 and 819), and goes back to Step 816, measuring elapsed time t. On the other hand, if time t3 has passed (t=t3), up-and-down change control unit 705 resets the timer so that it starts again (Step 820), and sets control target temperature Ts1(t) at elapsed time t so that the room temperature changes from Ts(min) to Ts(max) in given time period Δt3 (Step 821).

Then, up-and-down change control unit 705 measures elapsed time t (Step 822): and judges whether t4 has passed, t4 being t3+Δt3; whether t5 has passed, t5 being t4+Δt4; whether t6 has passed, t6 being t5+Δt5; and whether t7 has passed, t7 being t6+Δt6 (Step 823). When they have not passed yet, up-and-down change control unit 705 controls blowdown unit 706 so that detected room temperature T reaches Ts(t) (Steps 824 and 825).

On the other hand, when t4 has passed, up-and-down change control unit 705 sets control target temperature to control target temperature Ts2(t) at elapsed time t so that the room temperature is maintained at Ts(max) for a given time period Δt4; when t5 has passed, this unit 705 sets control target temperature to control target temperature Ts3(t) at elapsed time t so that the room temperature is changed from Ts(max) to Ts(min) at given time period Δt5; when t6 has passed, this unit 705 sets control target temperature to control target temperature Ts4(t) at elapsed time t so that the room temperature is maintained at Ts(min) for a given time period Δt6 (Step 826). After that, this unit 705 goes back to Step 822, measuring elapsed time t again. When t7 has passed, this unit 705 controls blowdown unit 706 so that a cyclical temperature change decided by control target temperature Ts1(t), Ts2(t),Ts3(t), and Ts4(t) is repeated (Steps 820–826). Moreover, up-and-down change control unit 705 uses Δt3 Δt4, Δt5, and Δt6 constituting one cycle, which are read out from change cycle storage unit 105a for deciding t4, t5, t6, and t7.

The above mentioned control is based on experimental data on human body temperature and perceived temperature after temperature is changed. Such temperature control maintains human body temperature and perceived temperature after temperature is changed within a certain range. Therefore comfort of a person in a room can be maintained even after temperature is changed.

Timing Chart for Heating Operation

FIG. 10A and FIG. 10B show timing charts of the room temperature and control target temperature by the room temperature control during heating of the present embodiment of the present invention. FIG. 10A shows changes in room temperature and FIG. 10B shows changes in control target temperature.

When heating is started with set temperature being Ts(0), initial control unit 702 carries out temperature control so that the room temperature which was Ta before heating reaches Ts(0) at elapsed time t0. Ts(0) is maintained for Δt afterwards.

Next, change control unit 704 carries out temperature control so that the room temperature goes down to Ts(1) by ΔT1 during time period t1–t2 (Δt2). This means that energy-saving operation without damaging comfort of the person in the room was started.

At t2, up-and-down change control unit 705 decides lowest limit temperature Ts(min) and highest limit temperature Ts(max) to be used as control target temperatures. At this stage, Ts(1) is already set to Ts(min), so there is no need to change the room temperature from Ts(1) to Ts(min). So Steps 815 to 819 in FIG. 9 are not carried out. For this reason, t2 and t3 are the same time in FIG. 10A and FIG. 10B.

Up-and-down change control unit 705 raises the room temperature to Ts(max) by gradually raising control target temperature from Ts(min) by ΔT2 during time period t3–t4 (Δt3), maintains the room temperature at Ts(max) during time period t4–t5 (Δt4), drops the room temperature to Ts(min) by gradually dropping the control target temperature from Ts(max) by ΔT2 during time period t5–t6 (Δt5), and maintains the room temperature at Ts(min) during time period t6–t7 (Δt6). After that, a cycle of temperature change from t3 to t7 is repeated. Accordingly, temperature control taking care of changes in human body temperature can be continued.

As is obvious from FIG. 10A and FIG. 10B, the room temperature is controlled after it has been changed, so that it becomes lower than the set temperature, which enables an air conditioner to continue energy-saving operation without damaging comfort of the person in the room.

Timing Chart for Cooling Operation

Figure 11A:
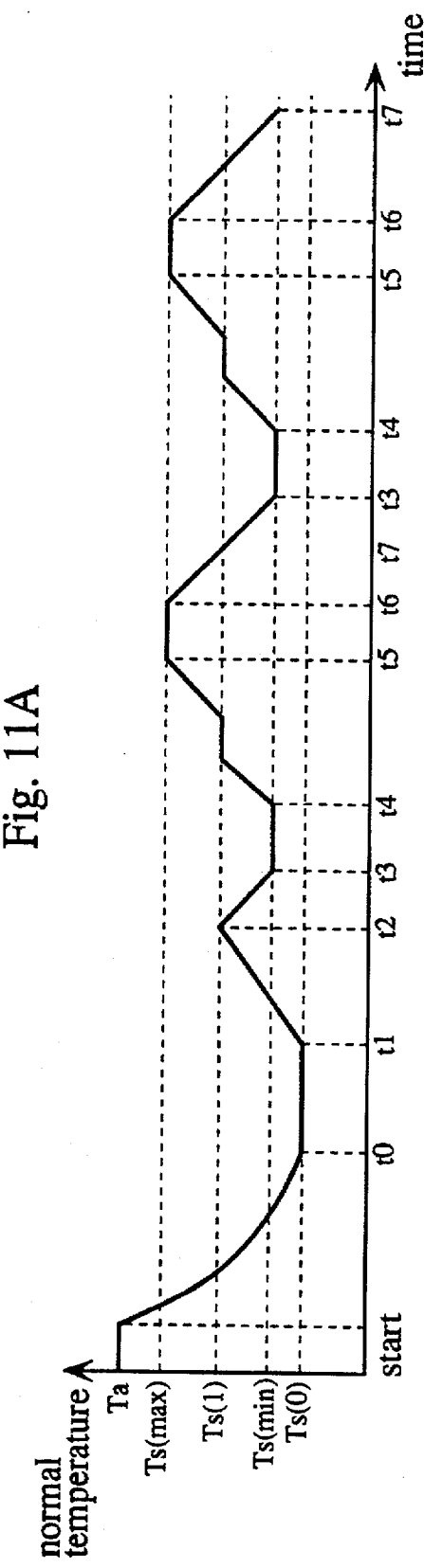
FIG. 11A is a graph showing changes in room temperature during cooling in Embodiment 2.
Figure 11B:
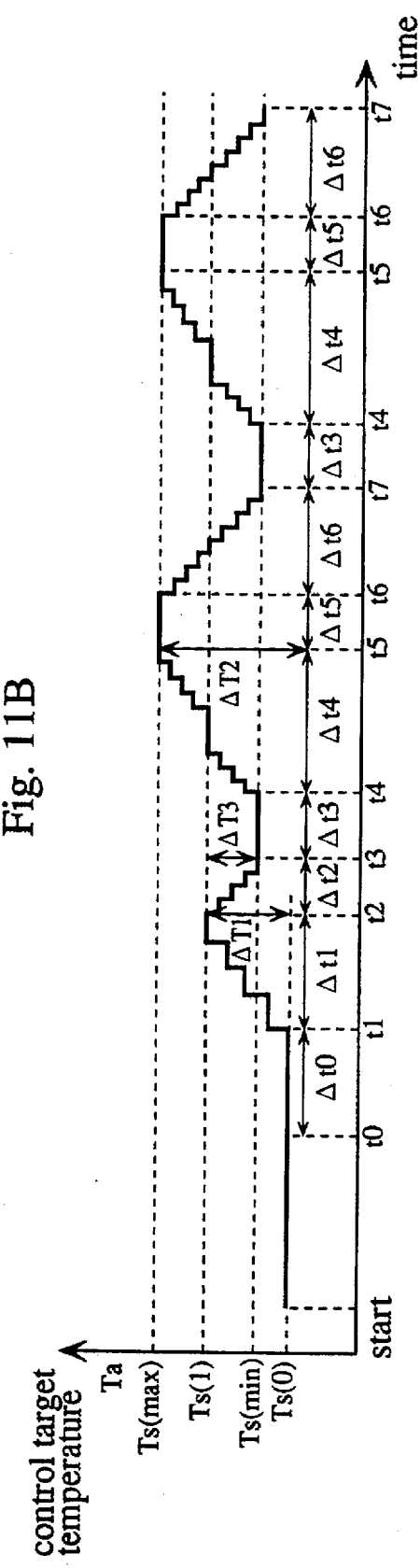
FIG. 11B is a graph showing changes in control target temperature during cooling in Embodiment 2.

FIG. 11A and FIG. 11B show timing charts of the room temperature and control target temperature of the room temperature control during cooling of the present embodiment of the present invention. FIG. 11A shows changes in room temperature, and FIG. 11B shows changes in control target temperature.

When cooling is started with set temperature being Ts(0), initial control unit 702 carries out temperature control so that the room temperature which was Ta before the cooling reaches Ts(0) at elapsed time t0. Ts(0) is maintained for Δt afterwards.

Change control unit 704 carries out temperature control so that the room temperature goes up to Ts(1) by ΔT1 during time period t1–t2 (Δt1). This means that energy-saving operation without damaging comfort of a person in a room was started.

At t2, up-and-down change control unit 705 decides lowest limit temperature Ts(min) and highest limit temperature Ts(max) to be sued as control target temperatures. After that, this unit 705 drops the temperature to Ts(min) by ΔT3 during time period t2–t3 (Δt2).

Up-and-down change control unit 705 maintains the room temperature at Ts(min) during time period t3–t4 (Δt3), raises the room temperature to Ts(max) by gradually raising the control target temperature from Ts(min) by ΔT2 during time period t4–t5 (Δt4), maintains the room temperature at Ts(max) during time period t5–t6 (Δt5), drops the room temperature to Ts(min) by gradually dropping the control target temperature from Ts(max) by ΔT2 during time period t6–t7 (Δt6). After that, a cycle of temperature change from t3 to t7 is repeated. Accordingly, temperature control taking care of changes in human body temperature can be continued.

As is obvious from FIG. 11A and FIG. 11B, the room temperature is controlled after it has been changed so that it becomes higher than the set temperature. Accordingly, operation of an air conditioner for saving energy can be continued without damaging comfort of the person in the room.

Result of an Experiment During Heating

The following explanation is about a cycle of changes in room temperature based on experimental data. The first explanation is about a case of heating operation.

Figure 12C:
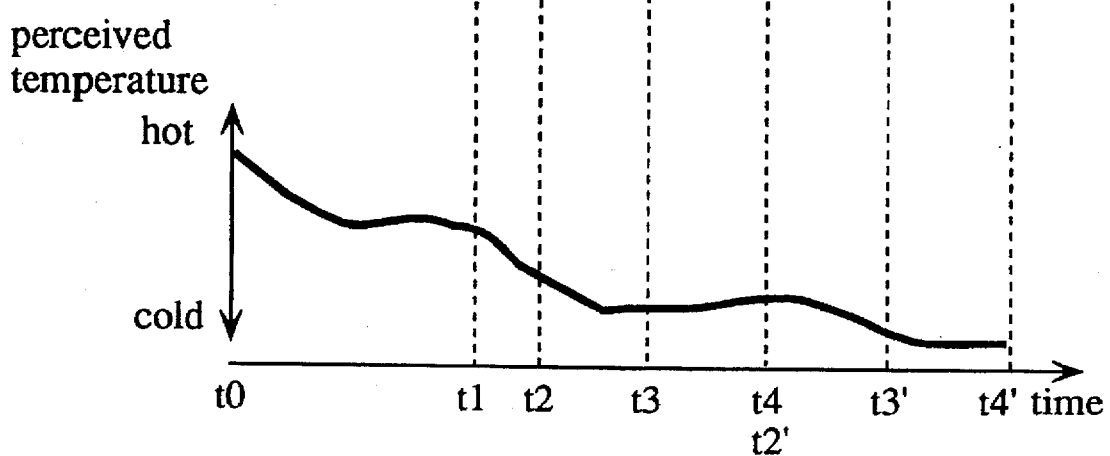
FIG. 12C is a graph showing changes in perceived temperature of experimental subjects.

FIGS. 12A, 12B, and 12C are data obtained from an experiment, the data showing how skin temperature and perceived temperature of experimental subjects changed after the room temperature changed during heating: FIG. 12A shows room temperature; FIG. 12B shows average of skin temperature of experimental subjects; and FIG. 12C shows average of temperature perceived by the experimental subjects. First, the experimental subjects adjust themselves to set temperature Ts(0), in which they do not feel neither hot nor cold. At this time, their skin temperature and perceived temperature are stable.

Next, the room temperature drops by ΔT1, which is the widest temperature change range within which human beings cannot perceive changes in room temperature (t1–t2). In this experiment, ΔT1 is set to about 1.5° C. Then, the skin temperature and perceived temperature drop along with the drop of room temperature during time period t1–t2. They continue dropping after t2 at which the room temperature stabilizes. They are stable during time period t3–t4.

However, even though the room temperature stabilizes, the skin temperature and perceived temperature drop again at t2'; the same pattern of change during time period t2–t4 happens during time period t2'–t4': when experimental subjects have adopted themselves to a stabilized set temperature, if the room temperature drops and the dropped room temperature continues, the skin temperature and perceived temperature cyclically repeat a pattern of drop and continuation. The average cycle of experimental subjects is 60 minutes. Such cyclical dropping pattern of the skin temperature was commonly observed among most of the experimental subjects.

The above experiment proves that skin temperature and perceived temperature repeats a cyclical pattern of drop and continuation if the temperature control is carried out only by changing the room temperature. As human body temperature continues a pattern of cyclical drop, only changing room temperature has limitation in guaranteeing comfort of a person in a room.

Therefore, up-and-down change control unit 705 suppresses the room temperature so that the cyclical drop of the skin temperature and perceived temperature after the economical temperature drop is controlled. In other words, this unit 705 recognizes temperature Ts(1) after the economical room temperature change as lowest limit temperature Ts(min) so that the room temperature does not go down below Ts(min). Moreover, this unit 705 raises room temperature to the highest limit temperature during time periods t2–t3 and t2'–t3'. In FIGS. 12B and 12C, drop of skin temperature and perceived temperature can be observed during those time periods.

The reason Ts(max) is defined by Ts(1)<Ts(max)≦Ts(0) is that the drop of skin temperature and perceived temperature can be controlled even though Ts(max) is not set higher than Ts(0), which is confirmed from an experiment.

Cycles S and S', in which the skin temperature and perceived temperature drop, are 40–80 minutes in FIGS. 12B and 12C. Therefore, one cycle of temperature change during heating, which is stored in change cycle storage unit 105a, is decided beforehand, the total of Δt3, Δt4, Δt5, and Δt6 being within a range of 40–80 minutes. In the present embodiment, it is 60 minutes, and values are set in such a way that temperature change pattern approximates to the change pattern of skin temperature shown in FIG. 12B. As room temperature is controlled according to the above time, cyclical drop of skin temperature is controlled for sure so that comfort of the person in the room can be maintained after room temperature is changed for economical reason.

Result of an Experiment During Cooling

The next explanation is about a case of cooling operation.

Figure 13A:
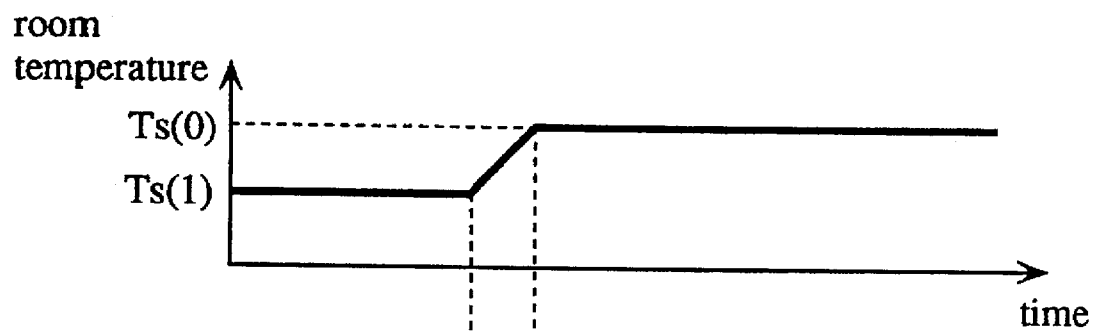
FIG. 13A is a graph showing changes in room temperature in an experiment of raising room temperature during cooling.
Figure 13B:
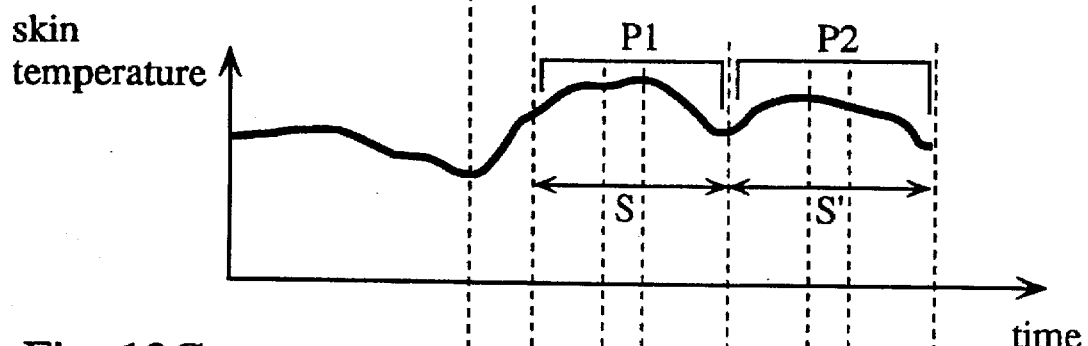
FIG. 13B is a graph showing changes in skin temperature of experimental subjects.
Figure 13C:
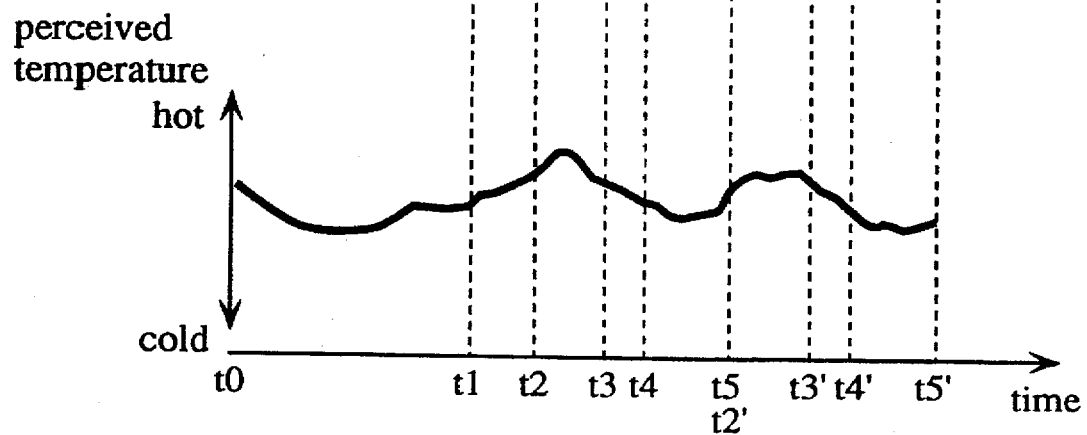
FIG. 13C is a graph showing changes in perceived temperature of experimental subjects.

FIGS. 13A, 13B, and 13C are data obtained from an experiment, the data showing how skin temperature and perceived temperature of experimental subjects changed after the room temperature changed during heating: FIG. 13A shows room temperature; FIG. 13B shows average of skin temperatures of experimental subjects; and FIG. 12C shows average of temperature perceived by the experimental subjects.

Like the case of heating operation, the experimental subjects adjust themselves to set temperature Ts(0), in which they do not feel neither hot nor cold. Then the room temperature rises by ΔT1, which is the widest temperature change range within which human beings cannot perceive changes in room temperature (t1–t2). In this experiment, ΔT1 is set to about 1.0° C. Then the skin temperature and perceived temperature go up along with the rise of room temperature during time period t1–t2. They continue rising after t2 at which room temperature stabilizes. They are stable during time period t3–t4.

However, even though the room temperature is stable, skin temperature and perceived temperature drop at t4. They reach to the point at which experimental subjects feel cooler compared to the time when the room temperature was rising (t2). After that, the same pattern of change during time period t2–t4 happens during time period t2'–t4'. In other words, if the room temperature drops when experimental subjects have adopted themselves to a stabilized set temperature and the dropped room temperature continues, the skin temperature and perceived temperature cyclically repeat a pattern of drop and continuation of the temperature. Such cyclical pattern was common among most of the experimental subjects, showing 50 minute-average.

The above experiment proves that the skin temperature and perceived temperature repeat a cycle of up-and-down change if the temperature control is carried out only by changing room temperature. In other words, as human body temperature continues cyclical dropping and rising as time goes by, only changing room temperature has limitation in guaranteeing comfort of the person in the room.

Therefore, up-and-down change control unit 705 controls the room temperature so that the cyclical up-and-down change in the skin temperature and perceived temperature after the economical temperature rise is suppressed: In order to control changes in skin temperature and perceived temperature during time periods t2–t3 and t2'–t3', this unit 705 controls the room temperature so that it drops to lowest limit temperature Ts(min) which is lower than set temperature Ts (1); during time periods t4–t5 and t4'–t5', this unit 705 controls the room temperature so that it goes up to highest limit temperature Ts(max) which is higher than Ts(1).

The reason Ts(min) is defined by Ts(0)≦Ts(min)<Ts(1) is that the rise of skin temperature and perceived temperature can be controlled even though Ts(min) is not set lower than Ts(0), which is confirmed from an experiment.

Cycles S and S' are 30–70 minutes in FIG. 13A and FIG. 13B. Therefore, one cycle of temperature change during cooling, which is stored in change cycle storage unit 105a, is decided beforehand, the total of $\Delta t3$, $\Delta t4$, $\Delta t5$, and $\Delta t6$ being within a range of 30–70 minutes. In the present embodiment, it is 50 minutes, and values are set in such a way that the up-and-down change pattern approximates to the pattern of skin temperature change shown in FIG. 13B. As room temperature is controlled according to the above time, cyclical drop of skin temperature is suppressed for sure so that comfort of the person in the room can be maintained after the room temperature is changed for economical reason.

Change cycle storage unit 105a stores a combination of $\Delta t3$, $\Delta t4$, $\Delta t5$, and $\Delta t6$ for heating and cooling operation. But this unit can store combinations of them beforehand, and up-and-down change control unit 705 can carry out temperature control by using a combination with changing a part of it, or by using combination selected by a person or environment in which an air conditioner is placed. Then, more flexible and efficient temperature control can be realized.

$\Delta t3$, $\Delta t4$, $\Delta t5$, and $\Delta t6$ are set to certain values in order to approximate to the pattern of skin temperature change. The pattern of perceived temperature can also be taken in to account.

(Embodiment 3)

The temperature control device of the present embodiment can certainly carry out temperature change as the temperature control device does in Embodiment 1, using relatively easy temperature control method used in electric carpet and so on: temperature control method by turning on/off power to an exothermic body. Before explanation of the temperature control device, conventional temperature control method used in an electric carpet is explained as follows.

Surface temperature of an electric carpet is controlled by turning on/off power through a relay. Generally, a temperature setting unit of an electric carpet is equipped with a temperature scale, with each graduation in the scale corresponding to power supply off temperature.

The power supply off temperature is the temperature at which power to the exothermic body is turn off.

FIG. 14 shows an example of relation between the temperature scale having five degrees from M1 to M5 and the power supply off temperature. For example, when M3 is set, power to the exothermic body is turned on through a relay until exothermic body 1607 reaches 50° C. When a temperature detection unit like thermistor detects that the temperature of the exothermic body reached 50° C., power is turn off. After a given time period which is measured by a timer (e.g. two minutes), power is turned on again. When the temperature reaches 50° C. again, power is turn off again. Such control is repeated. In order to protect the relay, the power supply is stopped for a given time (power supply off time) after the exothermic body reaches power supply off temperature.

Accordingly, surface temperature of the electric carpet is maintained within a given range corresponding to the temperature scale. In order to save energy in a conventional temperature control device of an electric carpet, the following method has been used to reduce the surface temperature a little.

Figure 15:
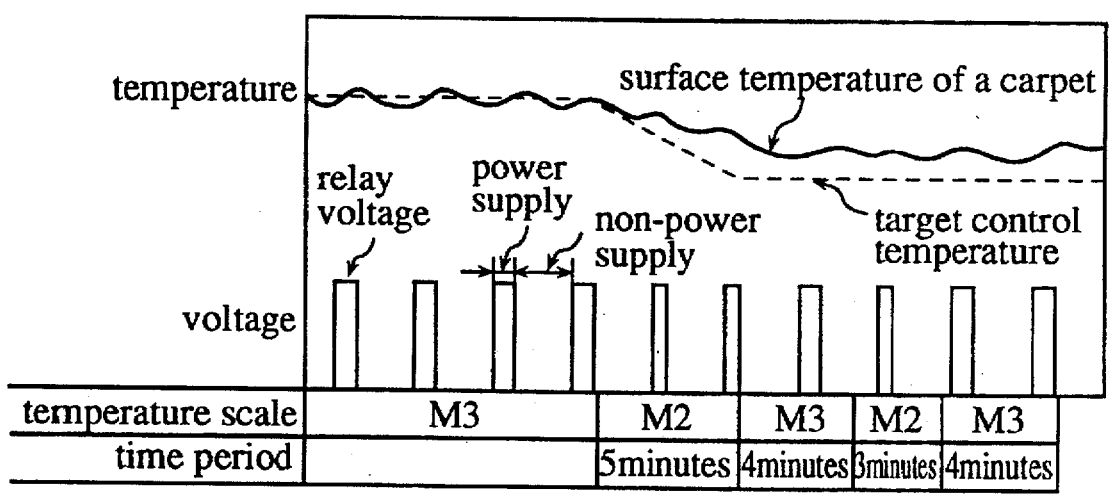
FIG. 15 shows a graph of changes in surface temperature of an electric carpet, control target temperature, and method of the temperature control in the conventional device.

FIG. 15 shows a graph of changes in surface temperature of an electric carpet, control target temperature, and method of the temperature control in the conventional device. In order to drop the surface temperature of the electric carpet a little, with the temperature corresponding to temperature scale M3, five-minute control is carried out at M2, four-minute control at M3, three-minute control at M2, and four-minute control at M3: In the conventional device, temperature control was carried out according to the combination of predetermined temperature scale and time.

However, this method does not necessarily drop surface temperature of the electric carpet to intended temperature due to timing of starting energy saving mode, room temperature, and so on. For example, in case of five-minute control at temperature scale M3, power could be supplied twice as shown in FIG. 15, or it could be supplied three times. As how many times power is supplied depends on external factors like room temperature, energy saving was not necessarily realized.

The temperature control device of Embodiment 3 is an improvement of the temperature control device of Embodiment 1. The aim is to continue energy saving without damaging comfort of a person in a room even after energy is saved by economical temperature change: to carry out temperature control of Embodiment 1 in a relatively easy temperature control method used in an electric carpet and the like.

Figures 16, 17:
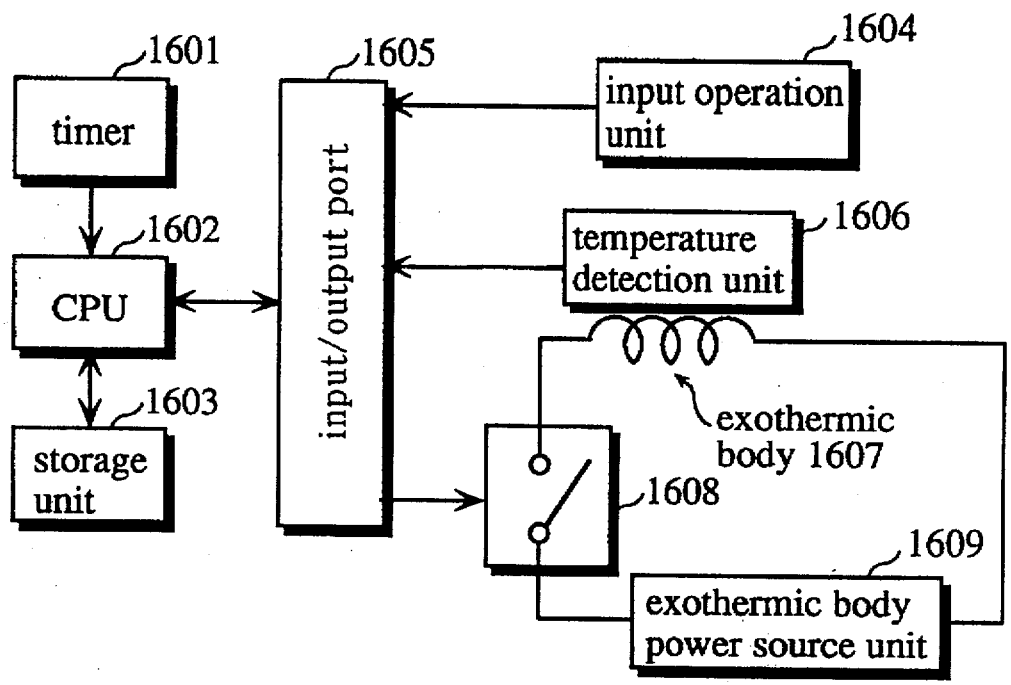
FIG. 16 is a block diagram of construction of a temperature control device of an electric carpet of Embodiment 3
FIG. 17 shows a control table stored in storage unit 1603 of the temperature control device of the electric carpet of Embodiment 3.

FIG. 16 is a block diagram showing construction of a temperature control device of an electric carpet of the present invention.

The temperature control device comprises timer 1601, CPU 1602, storage unit 1603, input/output port 1604, input operation unit 1605, temperature detection unit 1606, exothermic body 1607, switch unit 1608 and exothermic body power source unit 1609.

Input operation unit 1605 is a rotary switch with multi-contact, receiving temperature scale set by a person in a room. Exothermic body 1607 is a heater formed by a nichrome wire and the like which generates heat when power is supplied. Temperature detection unit 1606 is formed by a thermistor. This unit 1606 is adjacent to exothermic body 1607, detecting temperature of exothermic body 1607. Exothermic body power source unit 1609 supplies power to exothermic body 1607. Switch unit 1608 is an electromagnetic relay, turning on/off power from exothermic body power source unit 1609 to exothermic body 1607 according to instruction from CPU 1602. Input/output port 1604 is an interface circuit, carrying out signal conversion and signal amplification. Timer 1601 outputs one pulse signal a second.

Storage unit 1603 is composed of ROM and RAM, storing a control table in FIG. 17. The control table is obtained from an experiment beforehand. This table is a combination of temperature scale and number of times of supplying power for changing stable-state temperature at each temperature scale. For example, when an energy-saving operation starts at temperature scale M3, three-time power supply at M2 is carried out, followed by repetition of one-time power supply at each of M3 and M2. Storage unit 1603 stores a table in FIG. 14, control program and so on along with the control table.

CPU 1602 controls each constituting unit by executing the control program in storage unit 1603.

The following explanation is about operation of the temperature control device constituted in the above way.

Figure 18:
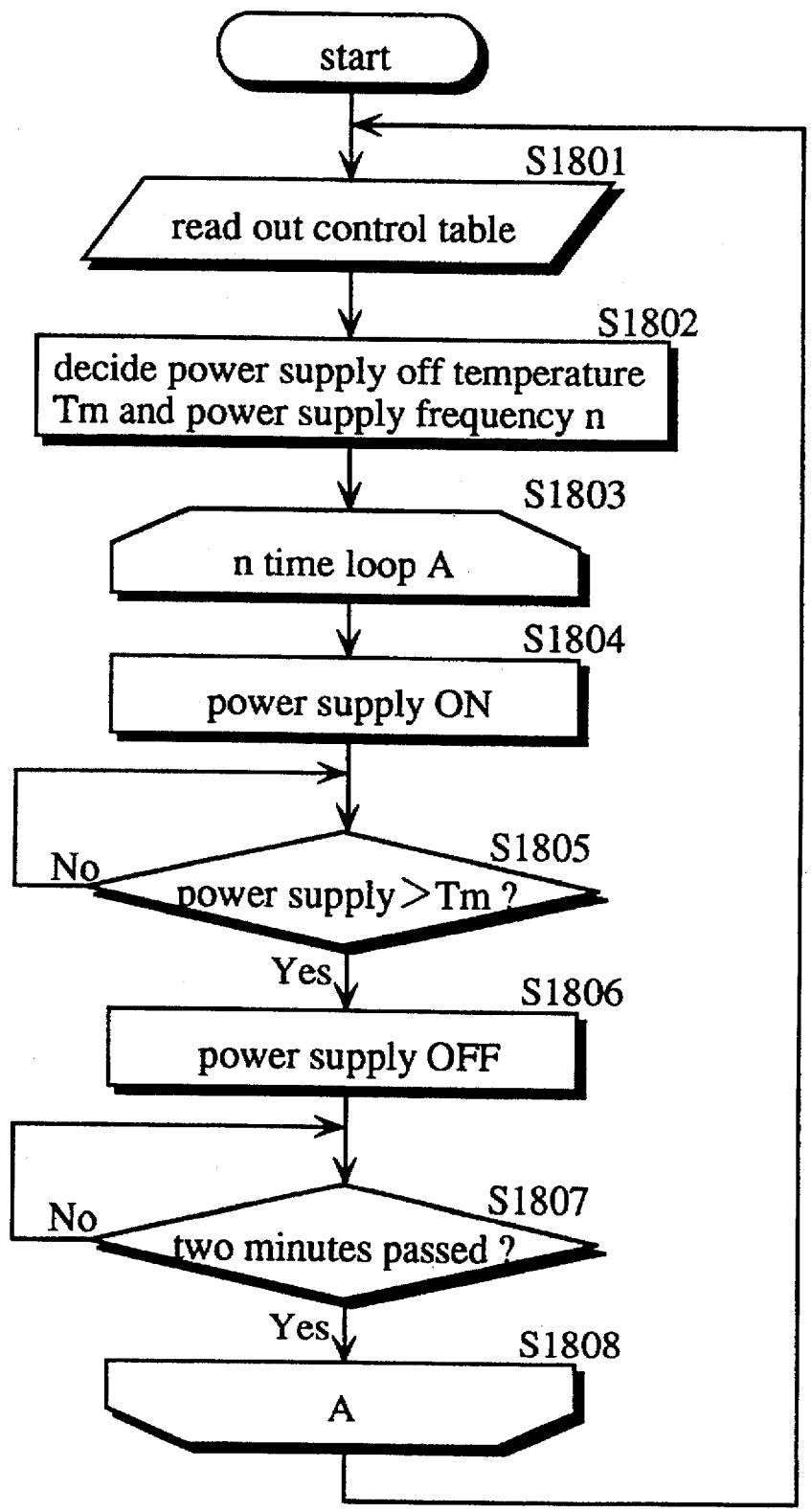
FIG. 18 is a flowchart showing operation of the temperature control device of the electric carpet of Embodiment 3.

FIG. 18 shows a flowchart of the operation. Only procedure after the start of the temperature change is shown.

CPU 1602 reads out temperature scale set by input operation unit 1605, and contents in the transitional period in the control table stored in storage unit 1603, the contents corresponding to the temperature scale (Step 1801). CPU 1602 decides power supply off temperature "Tm" and number of times of power supply "n", taking the contents and the table in FIG. 14 (Step 1802) into consideration. For example, if temperature scale is M3, Tm 40° C. and n 3 are decided.

Next, CPU 1602 controls switch unit 1608 so that temperature of exothermic body 1607 reaches power supply off temperature Tm, which happens n times (Steps 1803–1808).

Specifically, CPU 1602 turns switch unit 1608 on (Step 1804), waits for temperature of exothermic body 1607 reaches power supply off temperature Tm by monitoring temperature from temperature detection unit 1606 (Step 1805). When it happens, CPU 1602 turn switch unit 1608 off (Step 1806), and waits for a given time period (two minutes) by reading out a signal from timer 1601 (Step 1807). CPU 1602 repeats Steps 1804–1807 n times (Steps 1803–1808).

When temperature control in the transitional period ends, temperature control of repetition pattern starts, which also proceeds along with the flowchart in FIG. 18: contents of repetition pattern in FIG. 17 are read out and temperature control is carried out based on a given power supply off temperature and number of times of power supply.

Accordingly, the temperature control device of the present embodiment carries out temperature control by power supply off temperature and number of times unlike the conventional temperature control by power supply off temperature and time.

Figure 19:
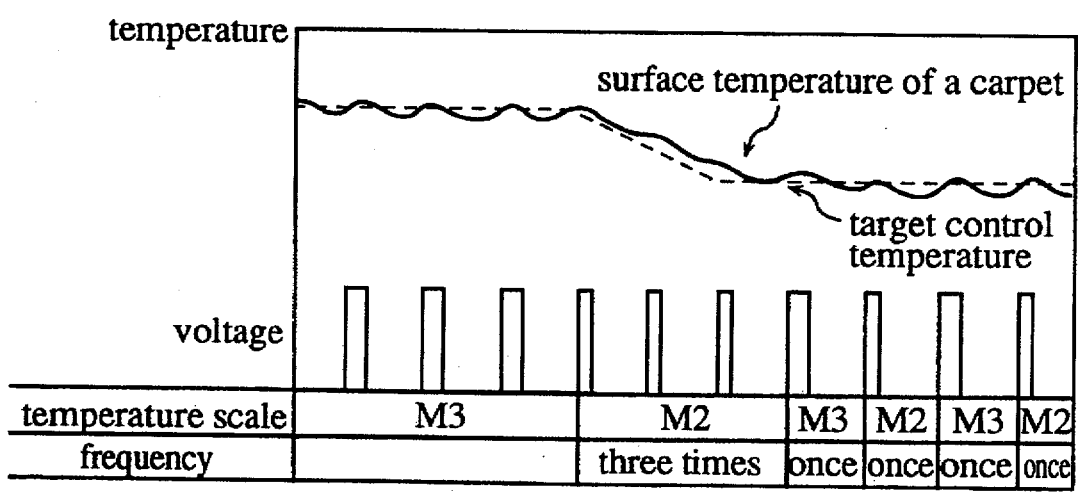
FIG. 19 is a graph of changes in surface temperature of an electronic carpet, control target temperature and a method of temperature control.

A graph in FIG. 19 shows changes in surface temperature of an electronic carpet when temperature is changed in a way explained above. FIG. 19 corresponds to FIG. 15, which is for the conventional temperature control device. FIG. 19 shows changes in surface temperature of an electronic carpet, control target temperature and a method of temperature control. The results were obtained from an experiment carried out in the following environment.

room temperature=wall temperature=22° C.

relative humidity=50%, wind velocity=below 0.15 m/s room capacity=5 m×5 m×2.3 m(height)

size of the electronic carpet=two tatami mat size, which is 1.8 meters by 1.8 meters demand=650 w As is obvious from comparing graphs in FIGS. 15 and 19, the surface temperature of the electronic carpet is controlled so that it approximates to the control target temperature in the temperature control device of the present embodiment. The reason is that a planned number of times of power supply is carried out for sure as temperature control is carried out by power supply off temperature and number of times. Accordingly, temperature control device of the present embodiment maintains lower surface temperature of the electronic carpet after the change of temperature than the conventional temperature control device. So energy can be saved.

Moreover, it is needless to say that the above control target temperature is for changing room temperature from steady state to the point at which human beings cannot perceive changes in temperature.

Although the present invention has been fully described by way of examples with reference to the accompanying drawings, it is to be noted that various changes and modifications will be apparent to those skilled in the art. Therefore, unless such changes and modifications depart form the scope of the present invention, they should be construed as being included therein.

What is claimed is:

1. A temperature control device of a heating apparatus comprising:

an input means for receiving input of a set temperature;

a heating means for raising temperature of a medium, from which a person receives heat;

a set temperature reaching means for controlling the heating means so that temperature of the medium is raised to the set temperature and maintained afterwards;

a time judgement means for judging whether a given time has passed after the temperature of the medium is raised to the set temperature; and an imperceptible temperature change means for controlling the heating means, if the time judgement means judges that the given time has passed, so that the temperature of the medium drops by an amount within a given range by which human beings cannot perceive changes in temperature at a temperature change rate by which human beings cannot perceive changes in temperature.

2. The temperature control device of claim 1, wherein the imperceptible temperature change means comprises:

a critical temperature storage means for storing critical temperature change rate during heating, above which human beings can perceive changes in temperature, and critical temperature change range during heating, beyond which human beings can perceive changes in temperature; and a temperature control means for reading out the critical temperature change rate and range from the critical temperature storage means and controlling the heating means so that the temperature of the medium drops according to the rate and range.

3. The temperature control device of claim 2, wherein the set temperature reaching means controls the heating means so that the temperature of the medium is raised with a greater temperature change rate than the temperature change rate used by the imperceptible change means.

4. The temperature control device of claim 3 further comprises an up-and-down change means for controlling the heating means so that the temperature of the medium repeats up-and-down change pattern for suppressing changes in human body temperature, which happen after the drop of temperature of the medium is caused by the imperceptible temperature change means.

5. The temperature control device of claim 4, wherein the up-and-down change means comprises:

a change pattern storage means for storing a highest limit temperature, lowest limit temperature and cycle during heating, all of which specify a predetermined up-and-down change pattern based on changes in human body temperature, which happen after the drop of temperature of the medium is caused by the imperceptible temperature change means; and a temperature change means for reading out the highest limit temperature, lowest limit temperature and cycle from the change pattern storage means and controlling the heating means so that the temperature of the medium repeats the up-and-down change pattern based on the highest and lowest limit temperatures and cycle.

6. The temperature control device of claim 5, wherein the cycle stored in the change pattern storage means is characterized by:

a first time period for raising the temperature of the medium from the lowest limit temperature to the highest limit temperature;

a second time period for maintaining the temperature of the medium at the highest limit temperature;

a third time period for dropping the temperature of the medium from the highest limit temperature to the lowest limit temperature; and a fourth time period for maintaining the temperature of the medium at the lowest limit temperature.

7. The temperature control device of claim 6, wherein the lowest limit temperature stored in the change pattern storage means equals the temperature of the medium, which is dropped by the imperceptible temperature change means, and the highest limit temperature stored in the change pattern storage means is above the lowest limit temperature and below the set temperature.

8. The temperature control device of claim 1, wherein the heating means comprises:

an exothermic means for generating heat;

a temperature detection means for detecting temperature of the exothermic means;

a power supply means for supplying power to the exothermic means; and a switch means for turning on/off the power to the exothermic means from the power supply means, and the imperceptible temperature change means comprises:

a power parameter storage means for storing a combination of power supply off temperature of the exothermic means and number of times of turning off the switch means at that power supply off temperature for dropping the temperature of the medium within the critical temperature change range with the critical temperature change rate; and a switch control means for reading out the turn-off temperature and number of times from the power parameter storage means, turning off the switch means in accordance with the number of times when the temperature detected by the temperature detection means reaches the power supply off temperature and turning on the switch means in accordance with the number of times when a given time period has passed afterwards.

9. A temperature control device of a cooling apparatus comprising:

an input means for receiving a set temperature;

a cooling means for dropping temperature of a medium, from which a person receives heat;

a set temperature reaching means for controlling the cooling means so that temperature of the medium is dropped to the set temperature and maintained afterwards;

a time judgement means for judging whether a given time has passed after the temperature of the medium is dropped to the set temperature; and an imperceptible temperature change means for controlling the cooling means, if the time judgement means judges that the given time has passed, so that the temperature of the medium rises by an amount within a given range by which human beings cannot perceive changes in temperature at a temperature change rate by which human beings cannot perceive changes in temperature.

10. The temperature control device of claim 9, wherein the imperceptible temperature change means comprises:

a critical temperature storage means for storing critical temperature change rate during cooling, above which human beings can perceive changes in temperature, and critical temperature change range during cooling, beyond which human beings can perceive changes in temperature; and a temperature control means for reading out the critical temperature change rate and range from the critical temperature storage means and controlling the cooling means so that the temperature of the medium rises according to the rate and range.

11. The temperature control device of claim 10, wherein the set temperature reaching means controls the cooling means so that the temperature of the medium is dropped with a greater temperature change rate than the temperature change rate used by the imperceptible change means.

12. The temperature control device of claim 11 further comprises an up-and-down change means for controlling the cooling means so that the temperature of the medium repeats up-and-down change pattern for suppressing changes in human body temperature, which happen after the rise of temperature of the medium is caused by the imperceptible temperature change means.

13. The temperature control device of claim 12, wherein the up-and-down change means comprises:

a change pattern storage means for storing a highest limit temperature, lowest limit temperature and cycle during cooling, all of which specify a predetermined up-and-down change pattern based on changes in human body temperature, which happen after the rise of temperature of the medium is caused by the imperceptible temperature change means; and a temperature change means for reading out the highest limit temperature, lowest limit temperature and cycle from the change pattern storage means and controlling the cooling means so that the temperature of the medium repeats the up-and-down change pattern based on the highest and lowest limit temperature and cycle.

14. The temperature control device of claim 13, wherein the cycle stored in the change pattern storage means is characterized by:

a first time period for raising the temperature of the medium from the lowest limit temperature to the highest limit temperature;

a second time period for maintaining the temperature of the medium at the highest limit temperature;

a third time period for dropping the temperature of the medium from the highest limit temperature to the lowest limit temperature; and a fourth time period for maintaining the temperature of the medium at the lowest limit temperature.

15. The temperature control device of claim 14, wherein the lowest limit temperature stored in the change pattern storage means is above the set temperature and below the temperature of the medium, which is raised by the imperceptible temperature change means, and the highest limit temperature stored in the change pattern storage means is above the temperature of the medium, which is raised by the imperceptible temperature change.

* * * * *